(12) United States Patent
Makino et al.

(10) Patent No.: US 8,031,246 B2
(45) Date of Patent: Oct. 4, 2011

(54) IMAGE SENSOR, ELECTRONIC APPARATUS, AND DRIVING METHOD OF ELECTRONIC APPARATUS

(75) Inventors: Eiji Makino, Kanagawa (JP); Takahiro Abiru, Kanagawa (JP); Ryoji Suzuki, Kanagawa (JP); Masahiro Itoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 672 days.

(21) Appl. No.: 12/119,825

(22) Filed: May 13, 2008

(65) Prior Publication Data

US 2008/0284884 A1 Nov. 20, 2008

(30) Foreign Application Priority Data

May 17, 2007 (JP) ................................. 2007-132099

(51) Int. Cl.
 *H04N 3/14* (2006.01)
 *H04N 5/235* (2006.01)
(52) U.S. Cl. .................... 348/296; 348/294; 348/362
(58) Field of Classification Search .............. 348/221.1, 348/222.1, 241, 294, 296, 300, 301, 302, 348/308, 362
See application file for complete search history.

(56) References Cited

U.S. PATENT DOCUMENTS

| 6,809,766 | B1 * | 10/2004 | Krymski et al. | 348/296 |
| 7,619,670 | B2 * | 11/2009 | Shah | 348/296 |
| 7,839,439 | B2 * | 11/2010 | Sato et al. | 348/241 |
| 2005/0104985 | A1 * | 5/2005 | Abe et al. | 348/308 |

FOREIGN PATENT DOCUMENTS

| JP | 2004-011590 | 1/2004 |
| JP | 2006-310932 | 11/2006 |

* cited by examiner

*Primary Examiner* — David Ometz
*Assistant Examiner* — Peter Chon
(74) *Attorney, Agent, or Firm* — SNR Denton US LLP

(57) ABSTRACT

An image sensor that has a pixel array section in which pixels are arrayed in a two-dimensional manner in vertical and horizontal directions and that controls an exposure time of each pixel in a rolling shutter method is disclosed. The sensor includes control means for determining an electronic shutter occurrence number within one horizontal scanning period, which is the number of rows where electronic shutters are simultaneously performed in one horizontal scanning period, by an operation based on an address addition amount ($P_1, P_2, P_3, \ldots, P_N$) when a vertical address movement amount of the pixel array section for every one horizontal scanning period in an exposure regulation shutter, which is an electronic shutter for regulating exposure, executed corresponding to electric charge reading in each pixel is expressed as repetition of the address addition amount ($P_1, P_2, P_3, \ldots, P_N$).

18 Claims, 13 Drawing Sheets

IMAGE SENSOR, ELECTRONIC APPARATUS, AND DRIVING METHOD OF ELECTRONIC APPARATUS

CROSS REFERENCES TO RELATED APPLICATIONS

The present invention contains subject matter related to Japanese Patent Application JP 2007-132099 filed in the Japanese Patent Office on May 17, 2007, the entire contents of which being incorporated herein by reference.

BACKGROUND OF THE INVENTION

1. Field of the Invention

The present invention relates to an image sensor, and more particularly, to an image sensor, an electronic apparatus, and a driving method of an electronic apparatus capable of taking anti-blooming measures with a simple configuration.

2. Description of the Related Art

In the case of a digital camera, there are a global shutter method and a rolling shutter method as main electronic shutter methods of an image sensor. The global shutter method is a method of performing a simultaneous shutter operation on all pixels of a pixel array in which pixels are arrayed in a two-dimensional manner, and the rolling shutter method is a method of shifting pixels, in which a shutter operation is performed, in the unit of a row with time without performing the simultaneous shutter operation on all pixels.

Furthermore, in the case of a digital camera, there is an operation mode for image adjustment called a preview mode in which adjustment of a focus or a viewing angle, adjustment of exposure, and the like are performed before imaging a still image by performing reading on the entire pixel array of an image sensor.

In the preview mode, an image that the image sensor currently catches is displayed on a liquid crystal screen provided in a main body of a digital camera in order to make a user confirm the situation of the image, for example. However, since the number of pixels on the liquid crystal screen is smaller than the total pixel number of the image sensor, it is necessary to perform pixel number compression conversion for converting an image, which is obtained in all pixels of the image sensor, into an image with a smaller number of pixels corresponding to the number of pixels on the liquid crystal screen.

In this case, when a method of displaying an image on the liquid crystal screen by reading all pixels of the image sensor and performing pixel number compression conversion by digital signal processing is adopted, a current consumed is increased due to an image compression conversion operation, an operation of all pixels of the sensor, and the like. For this reason, a method of performing compression inside the image sensor by using a compression function of a compression circuit, which is provided in the sensor, in the V direction (vertical direction) and the H direction (horizontal direction) is generally adopted.

For example, in a CMOS (complementary metal oxide semiconductor) image sensor, a thinned-out image on which pixel number compression is executed is generated by performing pixel thinning out, in which discontinuous rows (lines of pixels) are selected and interposed rows are skipped, called V thinning out for the V direction.

Referring to FIG. 1, an operation of V thinning out in an image sensor using a rolling shutter method will be described. FIG. 1 is an example of a ½ thinning-out mode in which ½ thinning out is performed in the V direction.

In FIG. 1, a horizontal axis indicates a time using one horizontal scanning period (1 [H]), which is a time for which one row located in the horizontal direction of a pixel array section is scanned, as a unit, and a vertical axis indicates a row address that is an address of a pixel row located in the V direction. Moreover, in FIG. 1, an accumulation time (exposure time) of light (electric charges) is set to 5 [H].

In addition, in the following description, pixels of R (red), G (green), and B (blue) of an image sensor are assumed to be arrayed in the Bayer array.

Assuming that reading of electric charges is performed in (pixels of) a row corresponding to a row address n at predetermined time t [H], the accumulation time is 5 [H] Accordingly, a shutter operation, that is, an operation of sweeping out electric charges is performed at time (t−5) [H] that is 5 [H] earlier than time t [H]. In addition, in (pixels of) a row corresponding to the row address (n+1), a shutter operation is performed at time (t−4) [H] corresponding to reading at time (t+1) [H]. In addition, in the following description, performing a shutter operation is simply referred to as performing a shutter or also referred to as occurrence of a shutter.

At time (t+2) [H], rows corresponding to row addresses (n+2) and (n+3) are skipped and a row corresponding to a row address (n+4) is read. At time (t−3) [H], a shutter is performed in the row of the row address (n+4) corresponding to that described above. In addition, since a row corresponding to a row address (n+5) is read at time (t+3) [H], a shutter is performed in the row of the row address (n+5) corresponding to that described above at time (t−2) [H].

Following row addresses of read rows with a row of a row address n read at time t [H], a row read after the row of the row address n is a row of a row address (n+1) when moving a row address by 1 and a row read after the row of the row address (n+1) is a row of a row address (n+4) which has moved from the row address (n+1) by 3.

Similarly, a row read after the row of the row address (n+4) is a row of a row address (n+5) which has moved from the row address (n+4) by 1, and a row read after the row of the row address (n+5) is a row of a row address (n+8) which has moved from the row address (n+5) by 3.

That is, the rows read in the V direction are rows obtained by making a sequential movement with a movement amount of 1, 3, 1, 3, 1, 3, . . . . Accordingly, such V thinning-out operation is described as a V thinning-out operation of address addition amount (1, 3).

By performing the V thinning-out operation of the address addition amount (1, 3), two read rows and two skipped rows are alternately present in the V direction. The reason why two read rows and two skipped rows are alternately present in the V direction is because the image sensor is arrayed in the Bayer array.

That is, in the Bayer array, a GB row where pixels of G and B are alternately arranged and a GR row where pixels of G and R are alternately arranged are alternately arrayed in the V direction. Accordingly, since it is necessary to read electric charges with the GB row and the GR row adjacent to the GB row as a set, two read rows and two skipped rows are alternately provided.

In addition, it is sufficient not to continuously read GB rows or GR rows. That is, a GB row or a GR row adjacent to each other does not necessarily need to be read continuously.

In the V thinning-out operation of the address addition amount (1, 3) described with reference to FIG. 1, a row that is not read even once in one frame period is present. Specifically, the row that is not read even once in one frame period is a row corresponding to a row address (n+2) or a row corresponding to a row address (n+3), for example. In the case when such row that is not read even once in one frame period is present, saturated electric charges overflow from the row that is not read and leak to a read row. That is, a phenomenon called blooming occurs, and as a result, the quality of an image may be deteriorated. Here, one frame period is a period for which an image of one frame is read and is equal to 1 [H]×(the number of rows in the V direction). In a setting (15 fps) for reading 15 frames in a second, one frame period is about 63 msec.

Therefore, a read operation in which anti-blooming measures are taken is also performed in a known technique.

FIG. 2 is an example of a read operation in which anti-blooming measures are taken in the ½ thinning-out operation of the address addition amount (1, 3) described with reference to FIG. 1.

As the anti-blooming measures, a shutter is also performed on a row that is not read even once in one frame period. In the ½ thinning-out operation of the address addition amount (1, 3), an exposure regulation shutter and an electronic shutter (hereinafter, suitably referred to as an anti-blooming shutter) executed as anti-blooming measures are simultaneously performed on a pixel of a row address obtained by shifting a row address, in which an original electronic shutter (hereinafter, suitably referred to as an exposure regulation shutter) for regulating exposure is performed, by +2 rows as shown in FIG. 2. In FIG. 2, the exposure regulation shutter is indicated by the same double circle (◎) as in FIG. 1, and the anti-blooming shutter is indicated by a black circle (●).

Thus, it is possible to prevent blooming by executing the anti-blooming shutter simultaneously with the exposure regulation shutter.

Next, an example of another V thinning-out operation mode in which anti-blooming measures are taken in a ¼ thinning-out mode of address addition amount (3, 5) will be described with reference to FIG. 3.

Since the address addition amount is (3, 5), rows read in the V direction are pixels of rows obtained by moving a row address with a movement amount of 3, 5, 3, 5, 3, 5, . . . .

That is, assuming that reading of electric charges is performed in a row corresponding to a row address n at predetermined time t [H], an exposure regulation shutter is executed at time (t−5) [H] that is 5 [H] earlier than time t [H]. A row read at next time (t+1) [H] is a row of a row address (n+3) which has moved by 3 from the row address n read before, and the exposure regulation shutter is executed at a row of the row address (n+3) at time (t−4) [H] that is 5 [H] earlier than time (t+1) [H].

Then, a row read at next time (t+2) [H] is a row of a row address (n+8) which has moved by 5 from the row address (n+3) read before, and the exposure regulation shutter is executed at a row of the row address (n+8) at time (t−3) [H] that is 5 [H] earlier than time (t+2) [H].

Therefore, at time (t−5) [H], the anti-blooming shutter is executed simultaneously with the exposure regulation shutter, which is executed in the row address n, at rows of the row addresses (n+1) and (n+2) which are rows skipped among rows until a row of a row address (n+3) in which the exposure regulation shutter is executed at next time (t−4) [H].

Similarly, at time (t−4) [H], the anti-blooming shutter is executed simultaneously with the exposure regulation shutter, which is executed in the row address (n+3), at rows of row addresses (n+4), (n+5), (n+6), and (n+7) which are rows skipped among rows until a row of a row address (n+8) in which the exposure regulation shutter is executed at next time (t−3) [H].

As described above, it is possible to take anti-blooming measures also in the ¼ thinning-out mode of the address addition amount (3, 5).

Moreover, the ¼ thinned-out image may also be generated in the case of the address addition amount (5, 3), (1, 7), or (7, 1) other than the address addition amount (3, 5) shown in FIG. 3.

Moreover, the ½ thinned-out image may also be generated in the case of the address addition amount (3, 1) other than the address addition amount (1, 3) shown in FIG. 2.

In addition, although not shown, in order to generate a ⅛ thinned-out image, a combination of address addition amounts includes eight kinds of (1, 15), (3, 13), (5, 11), (7, 9), (9, 7), (11, 5), (13, 3), and (15, 1).

Moreover, a ⅓ thinned-out image may be generated by a thinning-out operation of an address addition amount (3) that repeats a value 3 as an address addition amount.

In recent years, a thinned-out image is often used as an image when imaging a moving image as well as a preview mode. Accordingly, even in the case of an image after V thinning out, a request of a high-quality image is increasing.

In addition, the size of a liquid crystal screen is diversified in a digital camera for mobile phones, for example. For this reason, types of a V thinning-out operation mode tend to be diversified so that it is possible to meet various kinds of liquid crystal screen sizes with one image sensor.

In a known technique, in order to meet various kinds of thinning-out modes such that it is possible to meet various kinds of liquid crystal screen sizes with one image sensor, the combination of address addition amounts and the position of an anti-blooming shutter at that time are stored in a table. Then, in the case of generating a predetermined thinned-out image, required information is acquired from the table according to the generated thinned-out image and a V thinning-out operation is executed. Accordingly, since it is necessary to mount a large-capacity table in a logic circuit in order to meet a number of combinations, it has been difficult to reduce the gate size and the chip size.

Furthermore, in the case of performing short exposure under the situation where a large amount of light is incident, blooming occurs from a row adjacent to an object row of an exposure regulation shutter even if the anti-blooming shutter described above is executed. As a result, deterioration of the image quality has often occurred.

In addition, also in the case of performing all pixel reading, in which there is no skipped row and it is considered that the anti-blooming shutter is not needed, the blooming occurs from the row adjacent to the object row of the exposure regulation shutter. As a result, deterioration of the image quality has often occurred.

Referring to FIG. 4, occurrence of blooming from a row adjacent to an object row of an exposure regulation shutter in a case of performing all pixel reading at accumulation time of 3 [H] will be described.

In an example shown in FIG. 4, the exposure regulation shutter of a row address n read at time (t+3) [H] is executed at time t [H]. Adjacent rows of the row address n where the exposure regulation shutter is executed include two rows of row addresses (n−1) and (n+1). Since a sweeping operation is performed on the row of the row address (n−1) at previous time (t−1) [H], a photodiode is not saturated with electric charges in many cases. Accordingly, a possibility that blooming will occur is low.

On the other hand, in a photodiode corresponding to the row address (n+1), a sweeping operation previously performed is about one frame period before. Accordingly, since the photodiode is saturated with electric charges in many cases, the electric charges over flow easily. For this reason, as shown by an arrow in FIG. 4, blooming from the row address (n+1) to the row address n may occur immediately after the exposure regulation shutter of the row address n. Particularly in the case when the row address (n+1) corresponds to a GR row of the Bayer array and a component (red light) having a long wavelength is large in the amount of incident light, leakage from an R pixel of the GR row to a G pixel of a GB row is large and deterioration of the image quality, such as a false color, caused by a difference between a G pixel of the GR row and the G pixel of the GB row and blooming occur.

As a known technique related to anti-blooming measures, there is a technique of performing an electronic shutter (anti-blooming shutter) in a non-read region in order to avoid blooming from the non-read region (for example, refer to JP-A-2006-310932).

In addition, there is a method of alleviating blooming onto an adjacent pixel by continuously resetting floating diffusion in a power source and throwing away electric charges leaking to the floating diffusion into the power source or avoiding the blooming by adding a switch for resetting a photodiode of a pixel in a non-accumulation period (for example, refer to JP-A-2004-11590).

SUMMARY OF THE INVENTION

However, in the technique proposed in JP-A-2006-310932, it is not possible to avoid blooming from a read row to a read row that has been described with reference to FIG. 4. Furthermore, the method disclosed in JP-A-2004-11590 has a problem that providing a switch for avoiding blooming is not suitable for miniaturization of a pixel.

Accordingly, since it is difficult to avoid a part of blooming or it is necessary to mount a large-capacity table in a logic circuit or to provide a switch in known anti-blooming techniques, it has been difficult to reduce the gate size and the chip size.

Therefore, in view of the above, it is desirable to take anti-blooming measures with a simple configuration.

According to a first embodiment of the present invention, there are provided an image sensor and an electronic apparatus that have a pixel array section in which pixels are arrayed in a two-dimensional manner in vertical and horizontal directions and that control an exposure time of each pixel in a rolling shutter method including: control means for determining an electronic shutter occurrence number within one horizontal scanning period, which is the number of rows where electronic shutters are simultaneously performed in one horizontal scanning period, by an operation based on an address addition amount $(P_1, P_2, P_3, \ldots, P_N)$ when a vertical address movement amount of the pixel array section for every one horizontal scanning period in an exposure regulation shutter, which is an electronic shutter for regulating exposure, executed corresponding to electric charge reading in each pixel is expressed as repetition of the address addition amount $(P_1, P_2, P_3, \ldots, P_N)$.

The control means may determine the electronic shutter occurrence number within one horizontal scanning period such that the electronic shutter occurrence number is equal in any one horizontal scanning period.

The control means may determine the electronic shutter occurrence number within one horizontal scanning period such that the number of times of electronic shutters occurring in a period equivalent to one frame is equal in each row in the vertical direction.

The control means may determine the electronic shutter occurrence number within one horizontal scanning period on the basis of a maximum value Q of an absolute value of each of the address addition amounts $P_1, P_2, P_3, \ldots, P_N$ in the case of generating a thinned-out image in which the number of pixels in the vertical or horizontal direction is thinned out according to the address addition amount $(P_1, P_2, P_3, \ldots, P_N)$.

The control means may make a control such that an electronic shutter is performed on rows of addresses in the vertical direction that are continuous by the determined electronic shutter occurrence number within one horizontal scanning period from an object row of the exposure regulation shutter.

The control means may make a control such that an electronic shutter is performed on Q or more rows of addresses in the vertical direction that are continuous from the object row of the exposure regulation shutter.

The control means may make a control such that the electronic shutter is performed on (Q+2) rows of addresses in the vertical direction that are continuous from the object row of the exposure regulation shutter.

The control means may determine the electronic shutter occurrence number within one horizontal scanning period on the basis of a maximum value R of an absolute value of each of nearest-neighbor addition amounts $P_1+P_2, P_2+P_3, P_3+P_4, \ldots, P_{N-1}+P_N, P_N+P_1$, which are obtained by adding address addition amounts of rows adjacent to each other, in the case of generating a thinned-out image in which the number of pixels in the vertical or horizontal direction is thinned out according to the address addition amount $(P_1, P_2, P_3, \ldots, P_N)$.

The control means may make a control such that an electronic shutter is performed on discontinuous rows of addresses in the vertical direction with every other row skipped from an object row of the exposure regulation shutter.

The control means may make a control such that the electronic shutter is performed on (R/2) or more discontinuous rows of addresses in the vertical direction with every other row skipped from the object row of the exposure regulation shutter.

The control means may make a control such that the electronic shutter is performed on $((R+2)/2))$ discontinuous rows of addresses in the vertical direction with every other row skipped from the object row of the exposure regulation shutter.

According to the first embodiment of the present invention, the electronic shutter occurrence number within one horizontal scanning period, which is the number of rows where electronic shutters are simultaneously performed within one horizontal scanning period, is determined by the operation based on the address addition amount $(P_1, P_2, P_3, \ldots, P_N)$.

According to a second embodiment of the present invention, there is provided an image sensor including a pixel array section in which pixels are arrayed in a two-dimensional manner in vertical and horizontal directions. Reading of electric charges accumulated in pixels and an exposure regulation shutter, which is an operation of sweeping out unnecessary electric charges, are performed sequentially in the unit of rows in the vertical direction, and a pre-shutter that is an operation of sweeping out unnecessary electric charges is performed before the exposure regulation shutter.

According to the second embodiment of the present invention, the pre-shutter that is an operation of sweeping out unnecessary electric charges is performed before the exposure regulation shutter.

According to the first and second embodiments of the present invention, it is possible to take anti-blooming measures with a simple configuration.

In addition, according to the first and second embodiments of the present invention, it is possible to reduce the gate size and the chip size.

DESCRIPTION OF THE PREFERRED EMBODIMENTS

Hereinafter, embodiments of the present invention will be described. The correspondence relationship between configuration requirements of the present invention and embodiments described in this specification or drawings is as follows. This description is made to confirm that embodiments supporting the present invention are described in this specification or drawings. Therefore, even if there exists an embodiment that is described in this specification or drawings but not described herein as what corresponds to the configuration requirements of the present invention, the embodiment is not to be interpreted as an embodiment which does not correspond to the configuration requirements. In contrast, even if an embodiment is described herein as what corresponds to the configuration requirements, the embodiment is not to be interpreted as an embodiment which does not correspond to a configuration requirement other than the configuration requirements.

An image sensor and an electronic apparatus according to a first embodiment of the present invention have a pixel array section (for example, a pixel array section 11 shown in FIG. 5) in which pixels are arrayed in a two-dimensional manner in vertical and horizontal directions. The image sensor (for example, an image sensor 1 shown in FIG. 5) that controls an exposure time of each pixel in a rolling shutter method includes a control means (for example, a sensor controller 16 shown in FIG. 5) that determines an electronic shutter occurrence number within one horizontal scanning period, which is the number of rows where electronic shutters are simultaneously performed in one horizontal scanning period, by an operation based on the address addition amount ($P_1$, $P_2$, $P_3$, ..., $P_N$) when a vertical address movement amount of the pixel array section for every one horizontal scanning period in an electronic shutter for regulating exposure, executed corresponding to electric charge reading in each pixel is expressed as repetition of the address addition amount ($P_1$, $P_2$, $P_3$, ..., $P_N$).

Hereinafter, embodiments of the present invention will be described with reference to the accompanying drawings.

Figure 5:
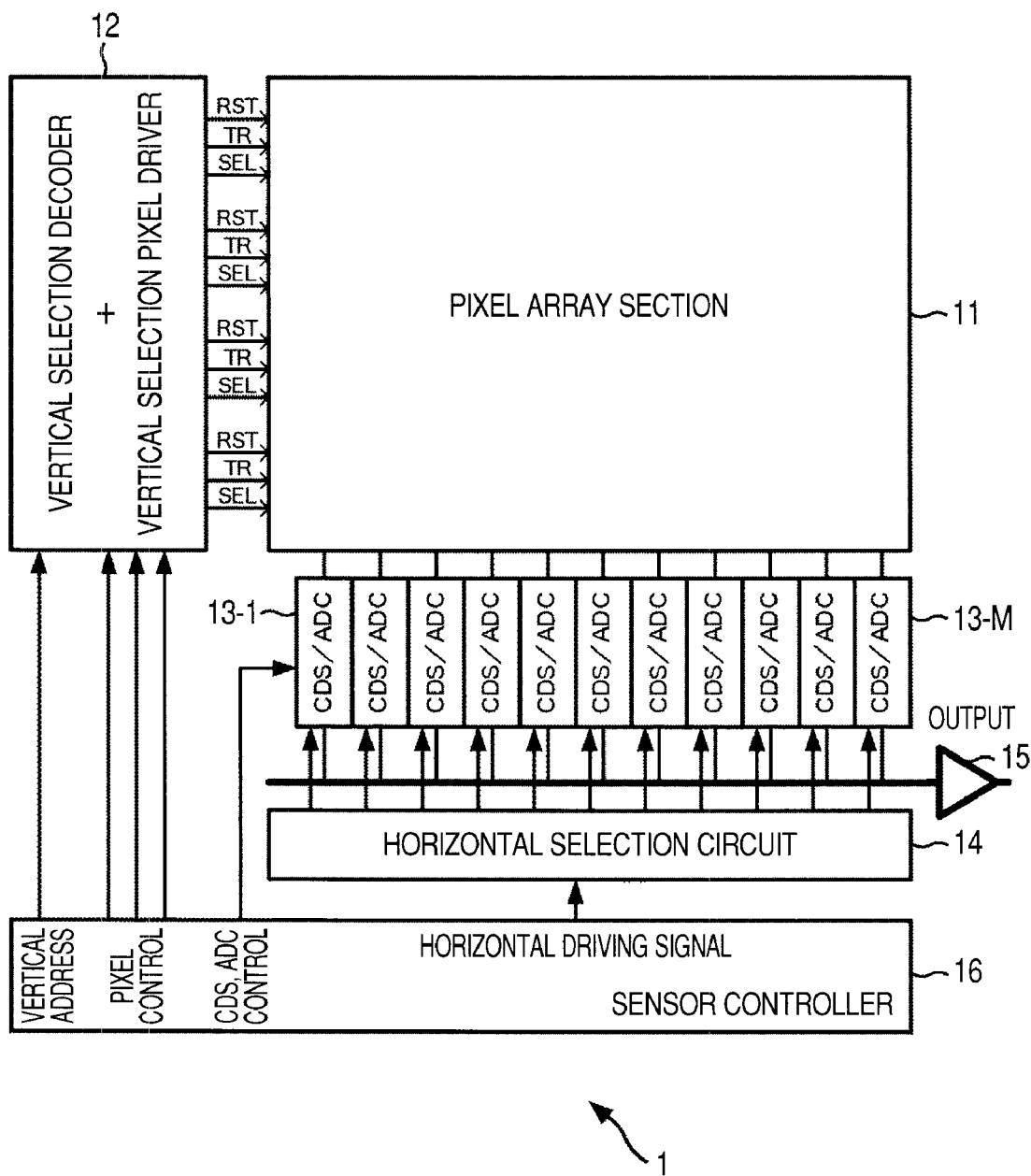
FIG. 5 is a block diagram illustrating an example of the configuration of an image sensor according to an embodiment of the present invention.

FIG. 5 is a block diagram illustrating an example of the configuration of an image sensor according to an embodiment of the present invention.

The image sensor 1 shown in FIG. 5 is an X-Y address access type solid-state imaging device, for example, a CMOS image sensor.

The image sensor 1 is configured to include a pixel array section 11, a V selection circuit 12, analog front end circuits 13-1 to 13-M, a horizontal selection circuit 14, an output amplifying circuit 15, and a sensor controller 16.

In the pixel array section 11, photoelectric conversion elements (not shown) as pixels are arrayed in a two-dimensional manner in N rows in a vertical direction by M columns in a horizontal direction (N rows×M columns). Each pixel of the pixel array section 11 photoelectrically converts light incident thereon and outputs an imaging signal obtained as the result. The V selection circuit 12 performs a charge read operation and a charge sweeping operation of a pixel of the pixel array section 11 in the unit of a row on the basis of a control of the sensor controller 16. Rows on which the read operation and the sweeping operation of the pixel array section 11 are performed are sequentially shifted with time. That is, the image sensor 1 is an image sensor using a rolling shutter method. An imaging signal output from each pixel on a row selected by the V selection circuit 12 is supplied to the analog front end circuits 13-1 to 13-M to which the position of the pixel in the horizontal direction corresponds.

Each of the analog front end circuits 13-1 to 13-M performs CDS (correlated double sampling) processing and A/D (analog to digital) conversion processing on an imaging signal supplied from a pixel of the pixel array section 11.

In addition, an AD converter that converts an analog signal into a digital signal may be provided before the output amplifying circuit 15 such that only CDS processing is performed in the analog front end circuits 13-1 to 13-M.

The horizontal selection circuit 14 sequentially selects and outputs imaging signals of the analog front end circuits 13-1 to 13-M and supplies the imaging signals to the output amplifying circuit 15. The output amplifying circuit 15 amplifies and outputs the input imaging signals.

The sensor controller 16 controls operation timing of the V selection circuit 12 and the horizontal selection circuit 14. In addition, the sensor controller 16 performs defect correction processing, AGC processing, and the like for correcting a defective pixel as needed.

Figure 12:
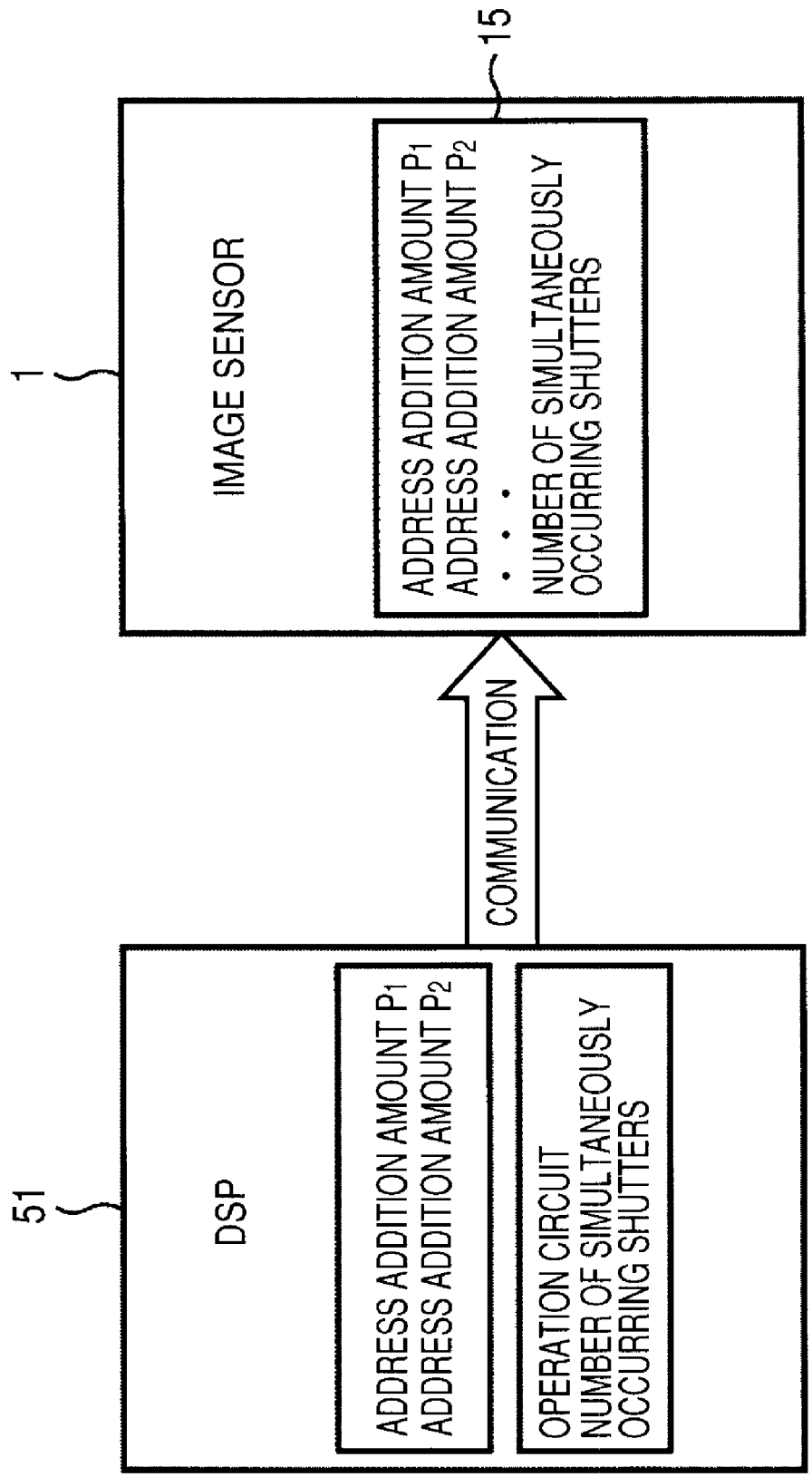
FIG. 12 is a block diagram illustrating an example of the configuration of an image sensor according to another embodiment of the present invention.

In addition, the address addition amount when generating a thinned-out image, for example, for matching with a liquid crystal screen having the number of pixels smaller than the number of all pixels of the pixel array section 11 is supplied and designated from a DSP (digital signal processor) 51 that controls the image sensor 1, which will be described in FIG. 12, to the sensor controller 16. The sensor controller 16 controls the V selection circuit 12 such that the V selection circuit 12 selects or does not select each row of the pixel array section 11 with the designated address addition amount.

Figure 1:
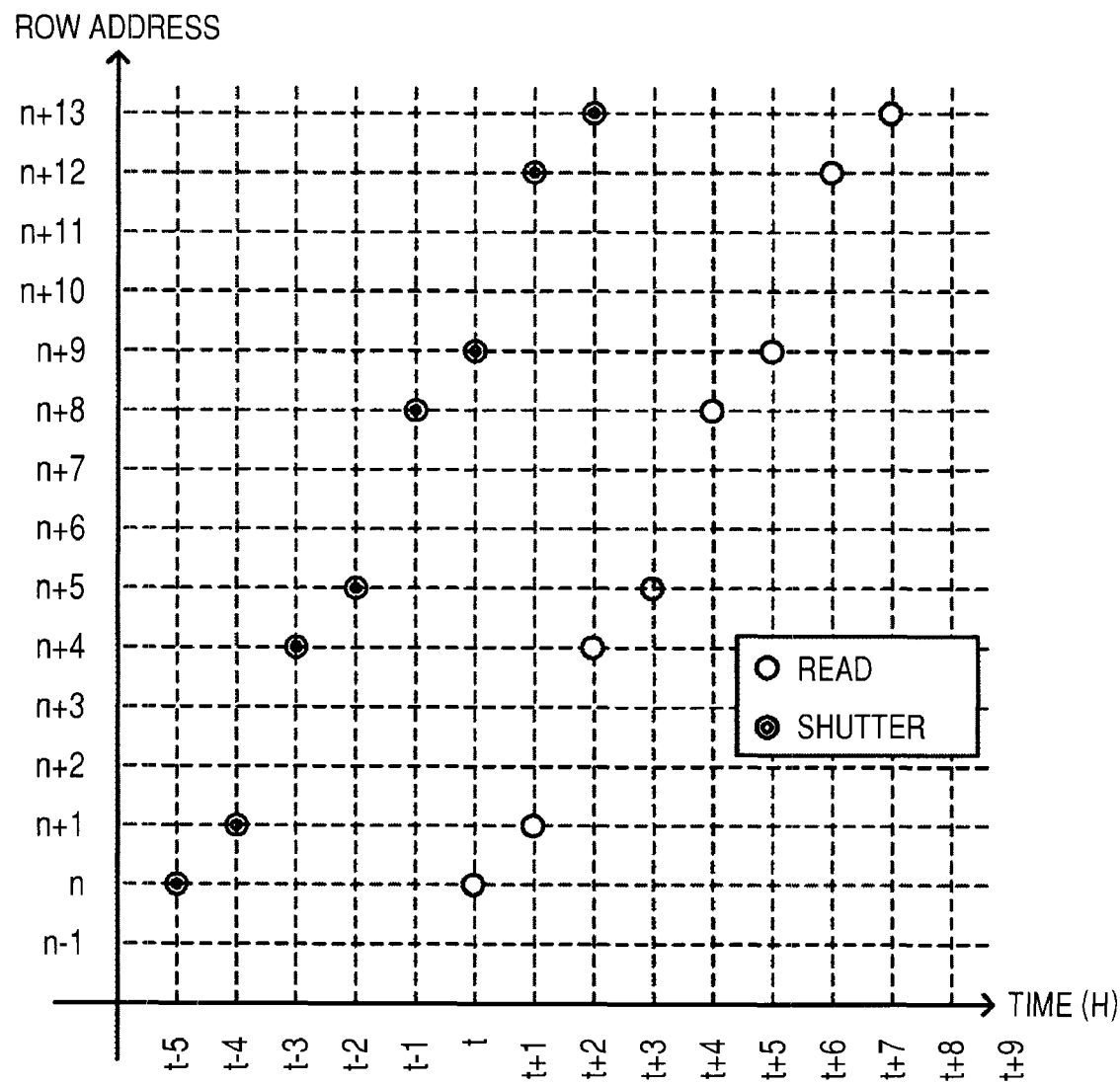
FIG. 1 is a view explaining an operation in a ½ thinning-out mode.
Figure 2:
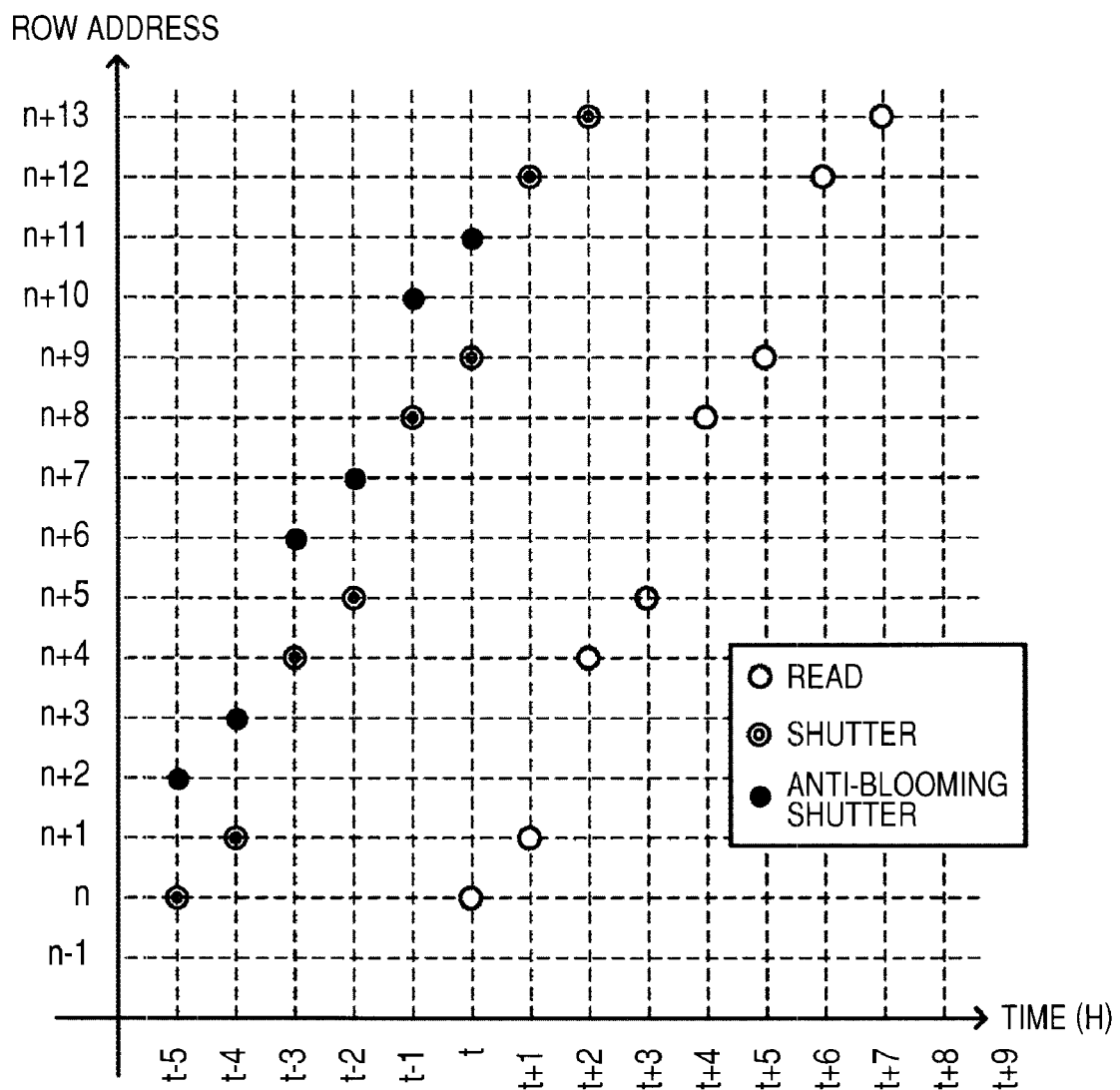
FIG. 2 is a view illustrating an example in which anti-blooming measures are taken in a ½ thinning-out operation.
Figure 3:
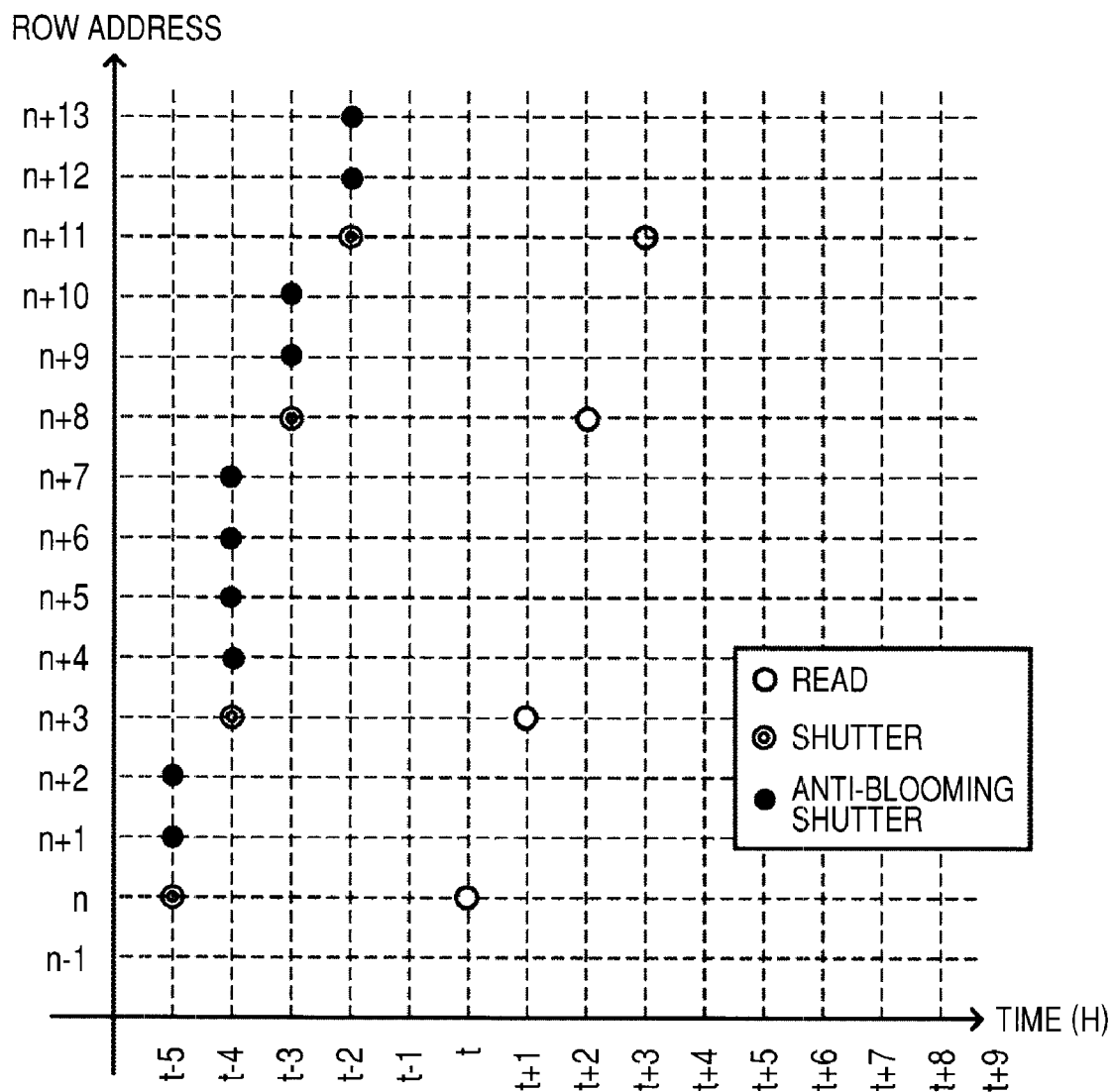
FIG. 3 is a view illustrating an example in which anti-blooming measures are taken in a ¼ thinning-out operation.

For example, as described above with reference to FIG. 1, when the address addition amount (1, 3) is supplied, the image sensor 1 generates a ½ thinned-out image. In addition, also in the case where the address addition amount (3, 1) is supplied, the ½ thinned-out image is generated.

Similarly, the image sensor 1 generates a ¼ thinned-out image when one of the address addition amounts (3, 5), (5, 3), (1, 7), and (7, 1) is designated from the DSP 51 and generates a ⅛ thinned-out image when one of the address addition amounts (1, 15), (3, 13), (5, 11), (7, 9), (9, 7), (11, 5), (13, 3), and (15, 1) is designated from the DSP 51.

In addition, in the case of generating a ⅓ thinned-out image or a ⅕ thinned-out image, one of (3) or (5) is sufficient as a parameter of an address addition amount designated from the DSP 51.

In addition, also in the case of being designated as the address addition amount (3, 3), the ⅓ thinned-out image can be similarly generated. Also in the case of being designated as the address addition amount (3, 5, 3, 5), the ¼ thinned-out image can be generated.

That is, in general, it can be said that the address addition amount $(P_1, P_2, P_3, \ldots, P_N)$ $(N \geq 1)$ is supplied from the DSP 51 to the sensor controller 16 in the case of generating a predetermined thinned-out image. Moreover, all pixel reading in which thinning out is not performed can also be expressed with the address addition amount $(P_1, P_2, P_3, \ldots, P_N)=(1, 1, 1, \ldots, 1)$.

Therefore, the sensor controller 16 controls the V selection circuit 12 to select a predetermined row (row address) on which an exposure regulation shutter is executed, according to the address addition amount $(P_1, P_2, P_3, \ldots, P_N)$ designated from the DSP 51.

In addition, the sensor controller 16 also controls the V selection circuit 12 in connection with an anti-blooming shutter operation for avoiding blooming or a pre-shutter operation to be described later in addition to the exposure regulation shutter. The sensor controller 16 calculates the number of rows (hereinafter, suitably referred to as an electronic shutter occurrence number), on which an electronic shutter occurs within one horizontal scanning period (1 [H]), on the basis of the address addition amount $(P_1, P_2, P_3, \ldots, P_N)$ designated from the DSP 51 and controls the V selection circuit 12 according to the calculation result.

Hereinafter, the way how the sensor controller 16 control the V selection circuit 12 to perform an electronic shutter is described below with reference to FIGS. 6 to 11.

First Embodiment

Figure 6:
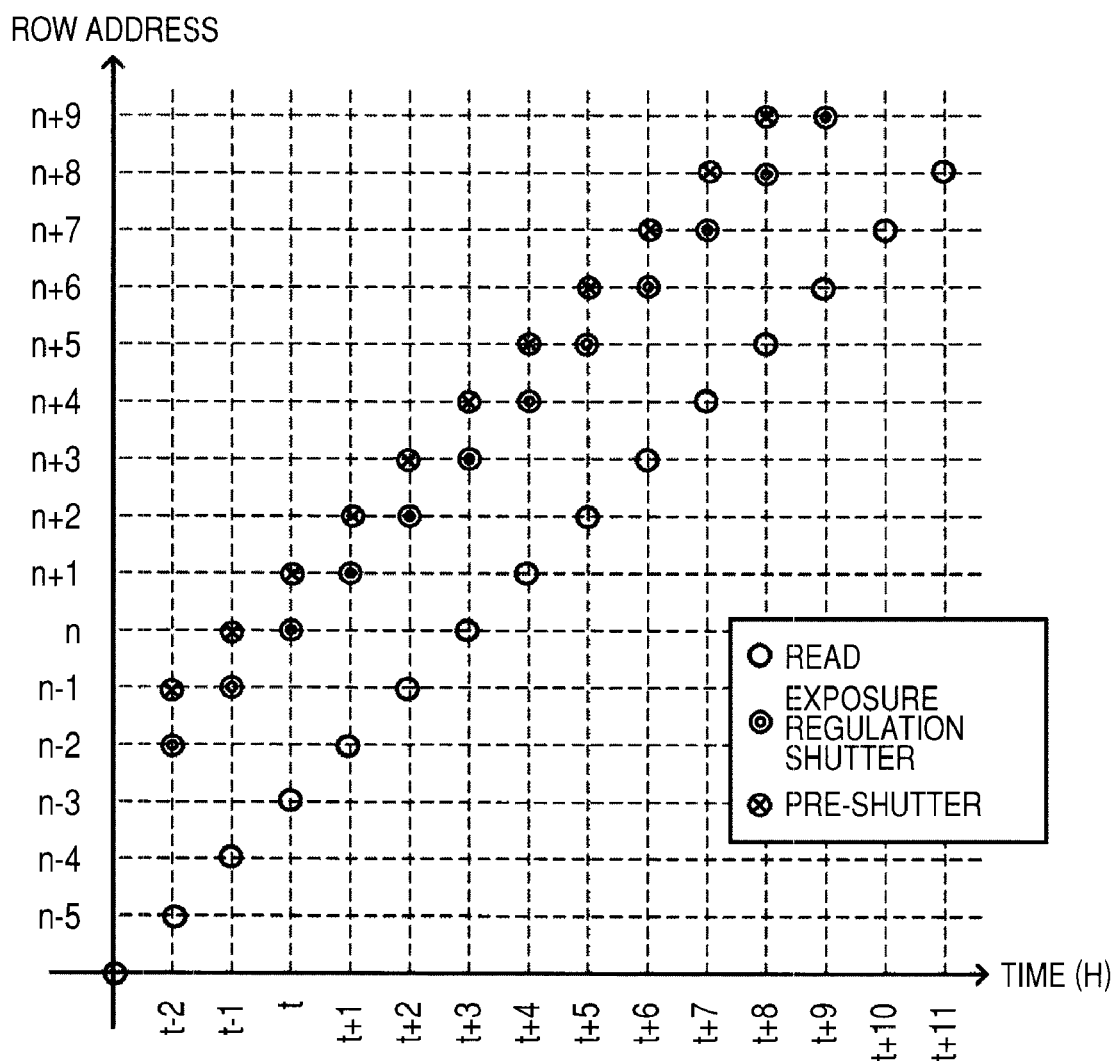
FIG. 6 is a view illustrating a first embodiment of electronic shutter occurrence number control.

FIG. 6 shows a first embodiment of a control of the electronic shutter occurrence number made by the sensor controller 16.

FIG. 6 illustrates an example in which a pre-shutter, which is a shutter having a function of suppressing blooming onto a row (object row for the exposure regulation shutter) on which the exposure regulation shutter is executed, is executed on the V selection circuit 12 in addition to the exposure regulation shutter in the case when the address addition amount (1) is designated from the DSP 51, that is, in the case when the image sensor 1 performs all pixel reading.

Figure 4:
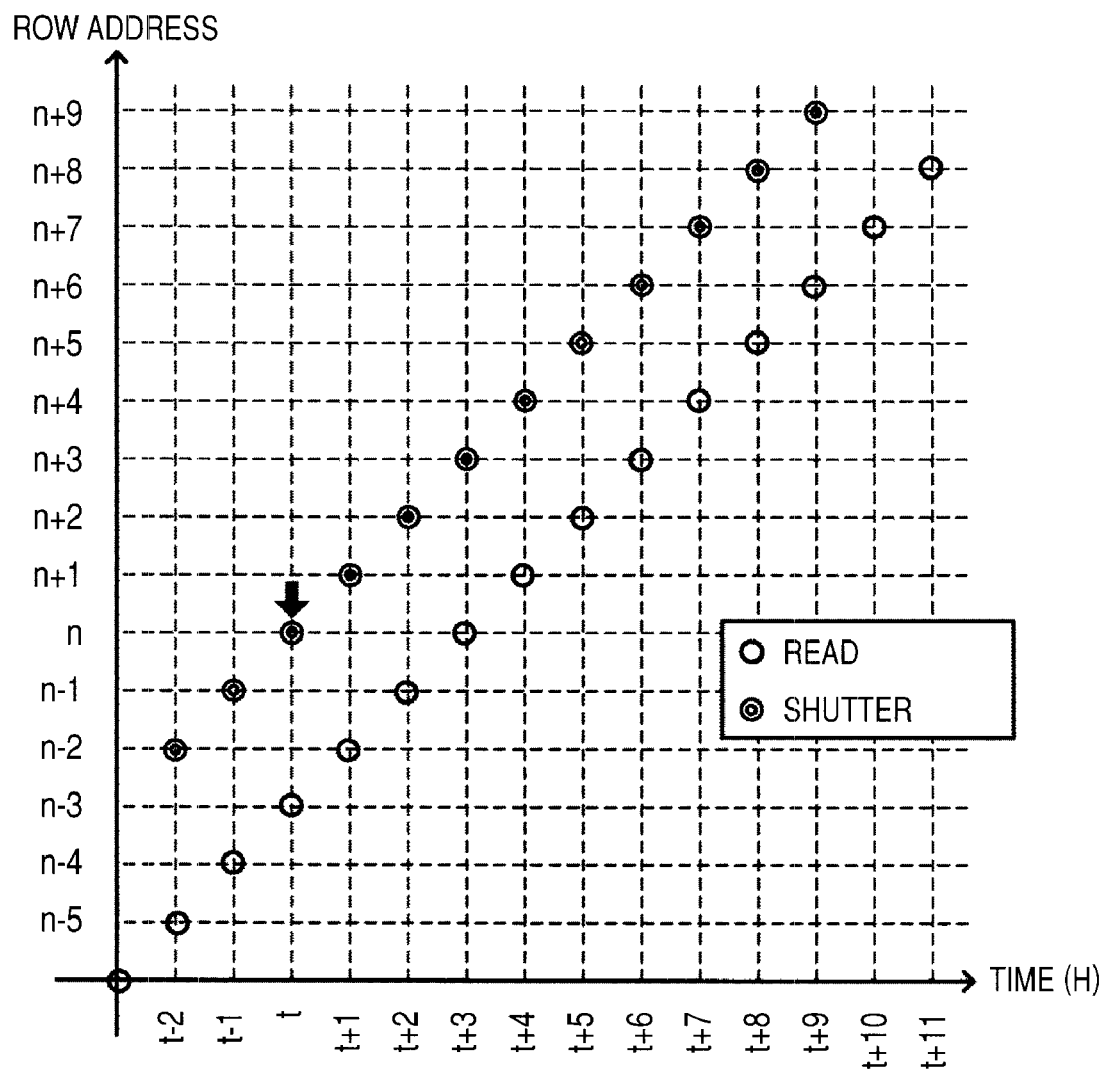
FIG. 4 is a view explaining occurrence of blooming at the time of all pixel reading.

Similar to the case shown in FIG. 4, FIG. 6 illustrates an example in which the image sensor 1 performs all pixel reading with an accumulation time 3 [H].

In FIG. 6, for example, an exposure regulation shutter of a row address n read at time (t+3) [H] is executed at time t [H], but the V selection circuit 12 executes a pre-shutter on a row address (n+1) together with the exposure regulation shutter of the row address n at time t [H] according to the control of the sensor controller 16.

Accordingly, for example, a sweeping operation is performed on a row of a row address (n−1), which is a row below the row address n, at time (t−1) [H] before the time t [H]. Thus, since the row of the row address (n−1) is under exposure, blooming from the row of the row address (n−1) is suppressed. In addition, since unnecessary electric charges accumulated until that time are swept out on a row of a row address (n+1), which is a row above the row address n, by the pre-shutter, blooming from the row of the row address (n+1) is also suppressed.

As a result, blooming from the row address (n+1) to the row address n, which is shown by arrow in FIG. 4, can be prevented.

The pre-shutter control is performed by sequentially moving a row address by +1 for every 1 [H] together with an exposure regulation shutter control.

In addition, paying attention to a row in connection with the pre-shutter control, it can be said that unnecessary electric charges accumulated until that time are swept out in each row by executing the pre-shutter before executing the exposure regulation shutter.

Furthermore, in the example shown in FIG. 6, timing at which the pre-shutter is performed is set to 1 [H] before performing the exposure regulation shutter. However, the timing at which the pre-shutter is performed is not necessarily limited to 1 [H] before performing the exposure regulation shutter. For example, the timing at which the pre-shutter is performed may be 3 [H] before performing the exposure regulation shutter. That is, it is preferable to sweep out electric charges beforehand so as not to leak while one prior row is being exposed. However, it changes depending on a situation at which time after a pre-shutter electric charges leak. Accordingly, as shown in FIG. 6, it is most preferable to perform the pre-shutter at the same timing as the exposure regulation shutter of one prior row.

In this case, it is general that an exposure time (accumulation time) in an image sensor changes according to the amount of light incident on a pixel.

Figure 7:
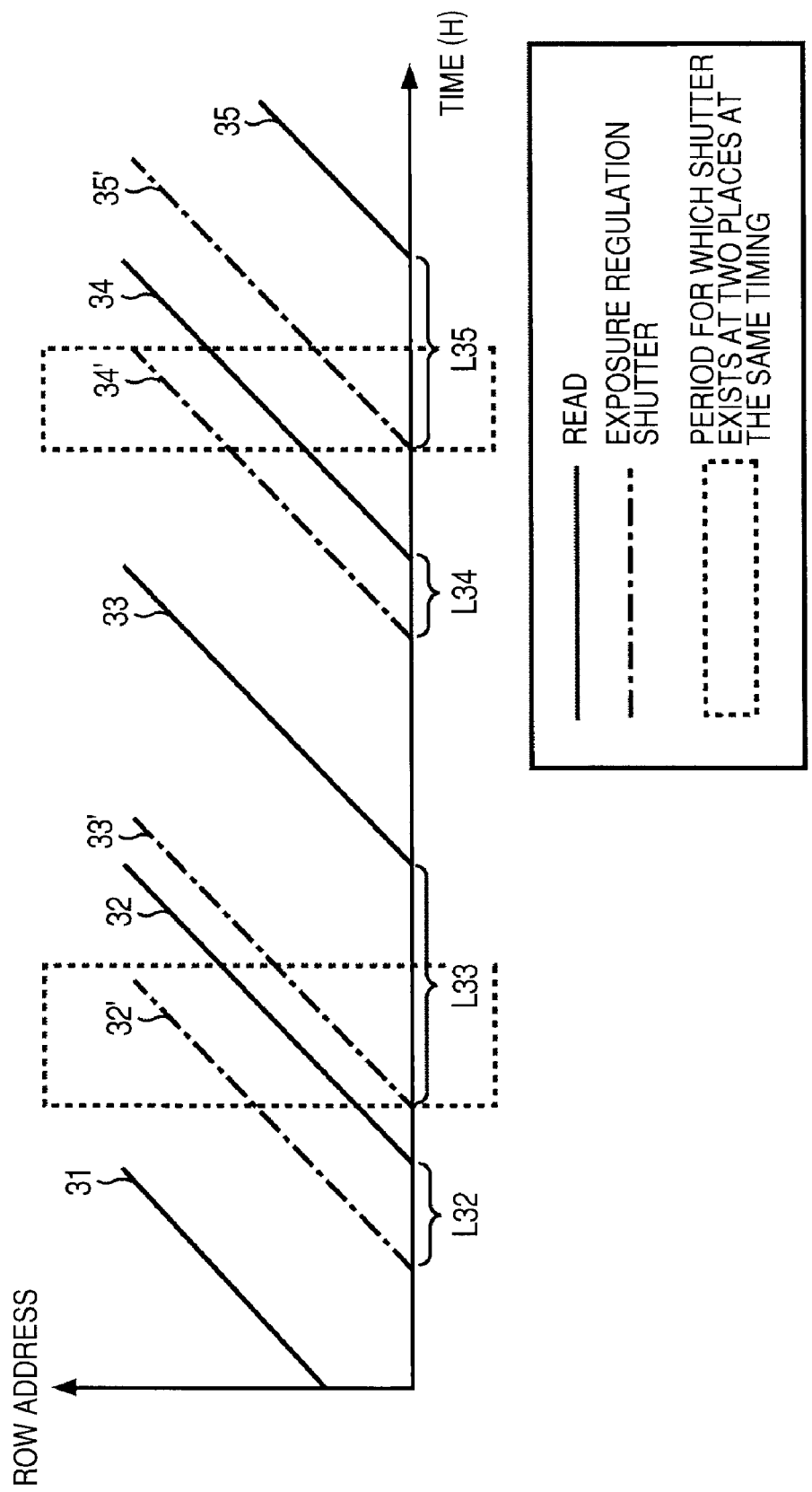
FIG. 7 is a view illustrating a shutter control in a period of several frames.

FIG. 7 is a view illustrating a shutter control in a period corresponding to several frames in a state where a horizontal axis in the time direction shown in FIG. 6 is set to be long.

Solid lines 31 to 35 shown in FIG. 7 correspond to a read operation indicated by a circle (○) in FIG. 6, and one-dotted chain lines 32' to 35' correspond to a double circle (◎) in FIG. 6 and are exposure regulation shutters corresponding to the read operation of the solid lines 31 to 35. In addition, a pre-shutter is not shown in FIG. 7. In addition, since one-time scanning in the entire V direction corresponds to an image of one frame, one solid line 32 or 33 shown in FIG. 7 corresponds to an image of one frame.

As shown in FIG. 7, as a result that the exposure time (accumulation time) has changed according to the amount of light incident on a pixel, an exposure time L32 of a image corresponding to the solid line 32, an exposure time L33 of a image corresponding to the solid line 33, an exposure time L34 of a image corresponding to the solid line 34, and an exposure time L35 of a image corresponding to the solid line 35 are different from one another.

In FIG. 7, the electronic shutter occurrence number within one horizontal scanning period, that is, the number of rows on which the electronic shutter is operated in one horizontal scanning period (1 [H]) is 3 (4 if a pre-shutter not shown in the drawing is included) in a horizontal scanning period indicated by a dotted line and is 1 or 2 (2 or 3 if a pre-shutter not shown in the drawing is included) in the other horizontal scanning periods.

Thus, since a load applied to a power source changes for every horizontal scanning period if the electronic shutter occurrence number per 1 [H] changes, a horizontal line may be generated in the case when a high gain is applied.

Therefore, the sensor controller 16 controls the V selection circuit 12 by inserting a dummy electronic shutter in a place, in which the electronic shutter occurrence number is smaller than a maximum electronic shutter occurrence number, in accordance with the maximum electronic shutter occurrence number such that the electronic shutter occurrence number is equal in any horizontal scanning period. Thus, since a load caused by an electronic shutter becomes uniform in each horizontal scanning period, it is possible to prevent the line described above from being generated. As a result, a high-quality image can be generated.

In addition, paying attention to each row, the sensor controller 16 may also make a control such that the number of times of electronic shutters occurring in a period equivalent to one frame is equal in each row of the pixel array section 11. Although it may be considered that incomplete transfer (transfer failure) easily occurs since a load caused by the pre-shutter or the dummy electronic shutter increases, it is possible to make an influence of the incomplete transfer not noticeable as the image quality by making the number of times of electronic shutters occurring in a period equivalent to one frame equal in each row of the pixel array section 11.

Second Embodiment

Figure 8:
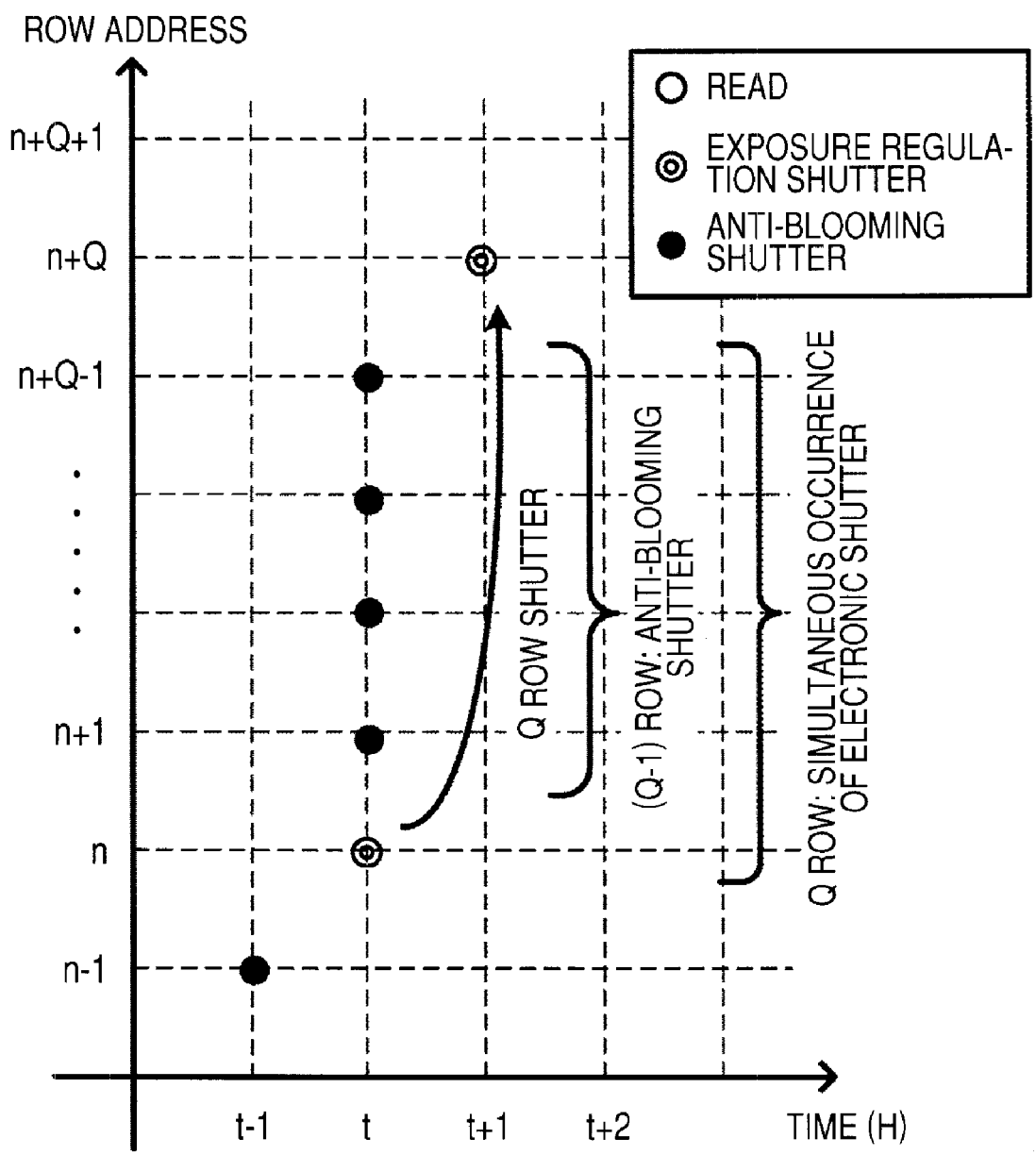
FIG. 8 is a view illustrating a second embodiment of the electronic shutter occurrence number control.

FIG. 8 shows a second embodiment of a control of the electronic shutter occurrence number made by the sensor controller 16.

In the second embodiment, the sensor controller 16 determines the electronic shutter occurrence number within one horizontal scanning period on the basis of a maximum value of an absolute value of each of the address addition amounts $P_1, P_2, P_3, \ldots, P_N$ when the address addition amount ($P_1, P_2, P_3, \ldots, P_N$) is designated from the DSP 51.

More specifically, assuming that the maximum value of the absolute value of each of the address addition amounts $P_1, P_2, P_3, \ldots, P_N$ is Q, the sensor controller 16 sets the electronic shutter occurrence number within one horizontal scanning period to Q or more and performs an electronic shutter on rows of Q or more continuous row addresses with a row address of an object row for an exposure regulation shutter as a reference.

The number of rows on which an anti-blooming shutter is operated in one horizontal scanning period (hereinafter, suitably referred to as a simultaneous occurrence number of anti-blooming shutter) increases as a thinning-out rate becomes higher, that is, the maximum value of the absolute value of each of the address amounts $P_1, P_2, P_3, \ldots, P_N$ increases.

Here, an example of a case in which a row address movement of the maximum value Q is made when performing an exposure regulation shutter at time (t+1) [H] after an exposure regulation shutter is performed at time t [H], for example, is shown in FIG. 8.

Rows that require anti-blooming measures such that electric charges do not leak to pixels on a row of a row address n where an exposure regulation shutter is performed at time t [H] are rows of a row address (n+1) to a row address (n+Q−1) inserted between a row of a row address n and a row of a row address (n+Q), and the number of rows is (Q−1) rows. Accordingly, a minimum electronic shutter occurrence number that needs to be performed at timing of time t [H] is "Q" including the exposure regulation shutter of the row address n in addition to (Q−1) rows of a row address (n+1) to a row address (n+Q−1).

Therefore, deterioration of the image quality caused by blooming can be suppressed by setting the electronic shutter occurrence number within one horizontal scanning period to Q or more.

Third Embodiment

Figure 9:
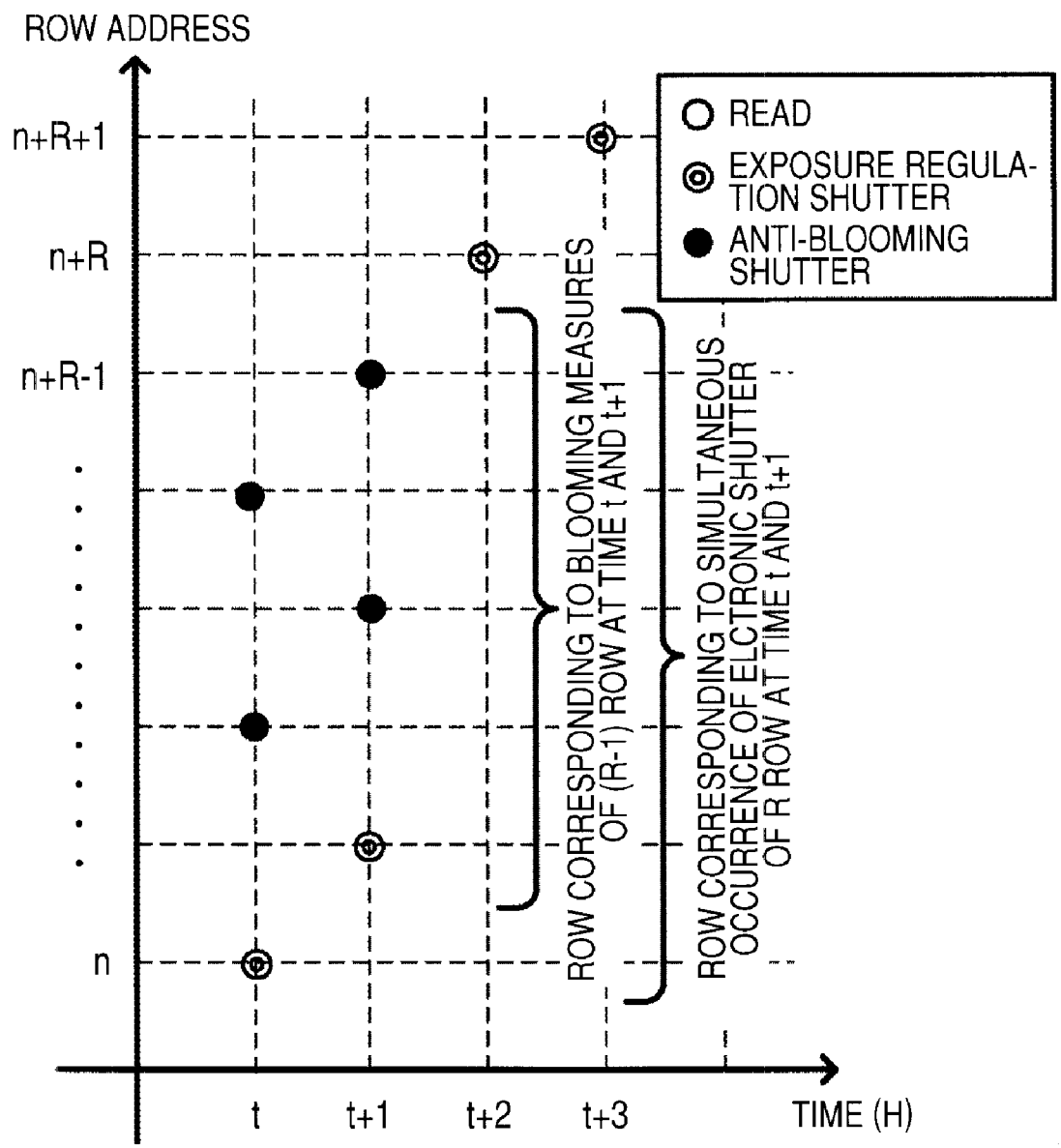
FIG. 9 is a view illustrating a third embodiment of the electronic shutter occurrence number control.

FIG. 9 shows a third embodiment of a control of the electronic shutter occurrence number made by the sensor controller 16.

In the third embodiment, the sensor controller 16 determines the electronic shutter occurrence number within one horizontal scanning period on the basis of a maximum value of an absolute value of each of the nearest-neighbor addition amounts $P_1+P_2, P_2+P_3, P_3+P_4, \ldots, P_{N-1}+P_N, P_N+P_1$, which are obtained by adding address addition amounts of rows adjacent to each other, when the address addition amount ($P_1, P_2, P_3, \ldots, P_N$) is designated from the DSP 51.

More specifically, assuming that the maximum value of the absolute value of each of the nearest-neighbor addition amounts $P_1+P_2, P_2+P_3, P_3+P_4, \ldots, P_{N-1}+P_N, P_N+P_1$ is R, the sensor controller 16 sets the electronic shutter occurrence number within one horizontal scanning period to R/2 or more and performs an electronic shutter on rows of R/2 or more discontinuous row addresses with every other row skipped by using a row address of a row, on which an exposure regulation shutter is to be executed, as a reference.

Similar to the second embodiment, the maximum value of the absolute value of each of the nearest-neighbor addition amounts $P_1+P_2, P_2+P_3, P_3+P_4, \ldots, P_{N-1}+P_N, P_N+P_1$ becomes higher as a thinning-out rate becomes higher, and the simultaneous occurrence number of anti-blooming shutters within one horizontal scanning period increases as the maximum value of the absolute value of each of the nearest-neighbor addition amounts $P_1+P_2, P_2+P_3, P_3+P_4, \ldots, P_{N-1}+P_N, P_N+P_1$ becomes higher.

Here, for example, assuming that the address addition amount ($P_1, P_2$) is designated from the DSP 51, the nearest-neighbor addition amount is $P_1+P_2$ and the value (maximum value of the absolute value) is assumed to be R.

An example of a case in which a row address movement from time t [H] to time (t+1) [H] occurs on a $P_1$ row and a row address movement from time (t+1) [H] to time (t+2) [H] occurs on a $P_2$ row is shown in FIG. 9.

The sensor controller 16 divides (R−1) rows, which are inserted between the row address n of an object row for the exposure regulation shutter at time t [H] and the row addresses (n+R) of an object row for the exposure regulation shutter at time (t+2) [H], into two horizontal scanning periods of time t [H] and time (t+1) [H] and performs the anti-blooming shutter.

Therefore, the minimum electronic shutter occurrence number that needs to be performed within one horizontal scanning period is (R/2) when an object row for the exposure regulation shutter is included, and deterioration of the image quality caused by blooming can be suppressed by performing the electronic shutter on rows of (R/2) or more discontinuous row addresses with every other row skipped including an exposure regulation shutter in each horizontal scanning period.

In addition, when (R/2) is a value that is not divisible, it is preferable to throw away a fractional part.

Fourth Embodiment

Figure 10:
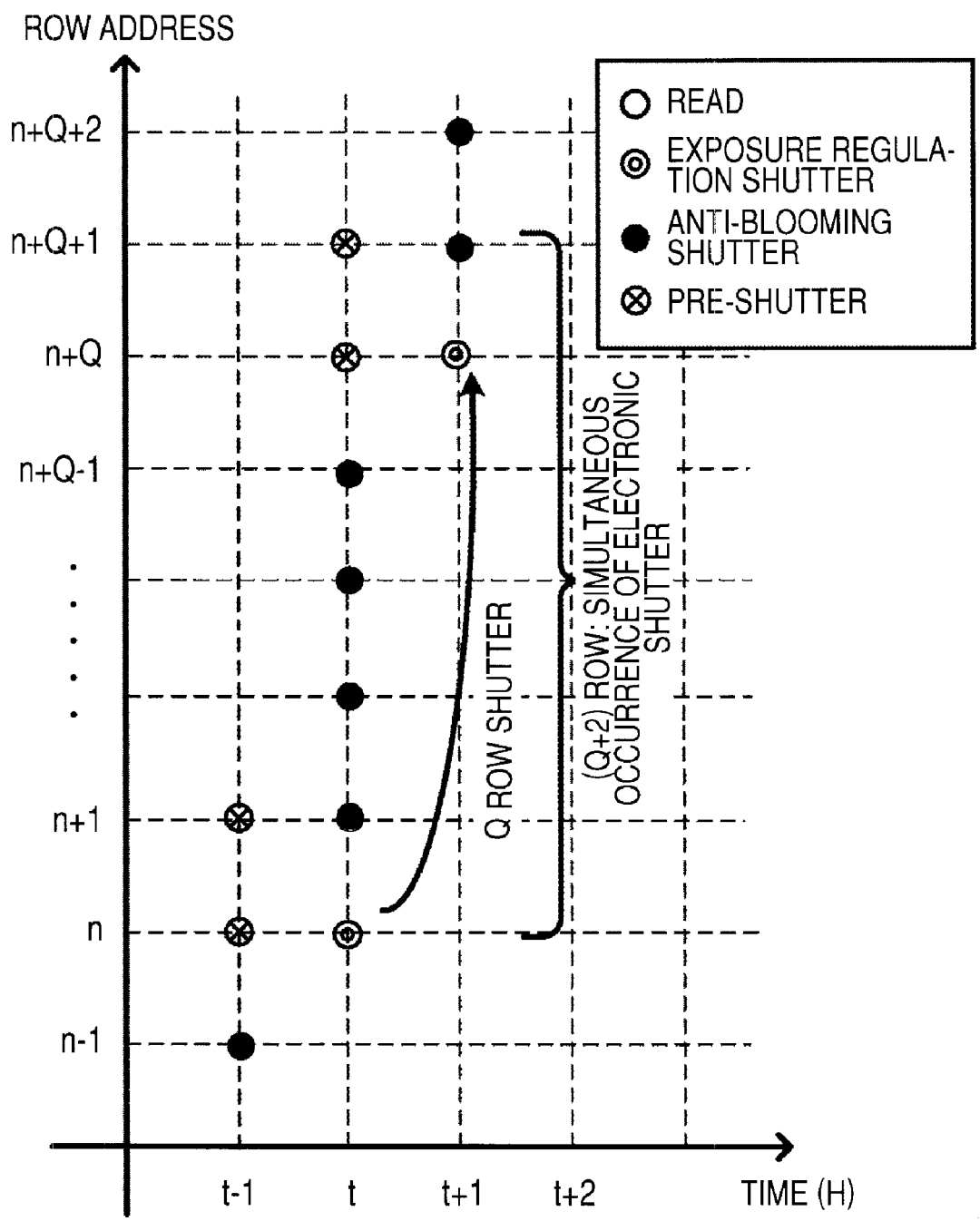
FIG. 10 is a view illustrating a fourth embodiment of the electronic shutter occurrence number control.

FIG. 10 shows a fourth embodiment of a control of the electronic shutter occurrence number made by the sensor controller 16.

The fourth embodiment is an embodiment in which a concept of the pre-shutter in the first embodiment is added to the second embodiment described with reference to FIG. 8.

At time t [H], a pre-shutter needs to occur on a row of a row address (n+Q+1) corresponding to an adjacent row of a row address (n+Q) which is an object row of the exposure regulation shutter at time (t+1) [H]. Accordingly, the electronic shutter occurrence number at time t [H] becomes (Q+2) obtained by adding two of pre-shutters to Q of the exposure regulation shutter and the anti-blooming shutter.

Therefore, deterioration of the image quality caused by blooming can be suppressed by setting the electronic shutter occurrence number within one horizontal scanning period to (Q+2) or more.

In addition, although it is preferable that the electronic shutter occurrence number within one horizontal scanning period be (Q+2) or more, it is most preferable that the electronic shutter occurrence number within one horizontal scanning period be (Q+2) since a current consumed increases or transfer failure easily occurs as the electronic shutter occurrence number increases.

The fourth embodiment described above is an example of the thinning-out mode. However, the concept of the anti-blooming shutter and the pre-shutter may also be applied to all pixel reading. Since Q is 1 in the case of all pixel reading, the electronic shutter occurrence number within one horizontal scanning period is three.

Fifth Embodiment

Figure 11:
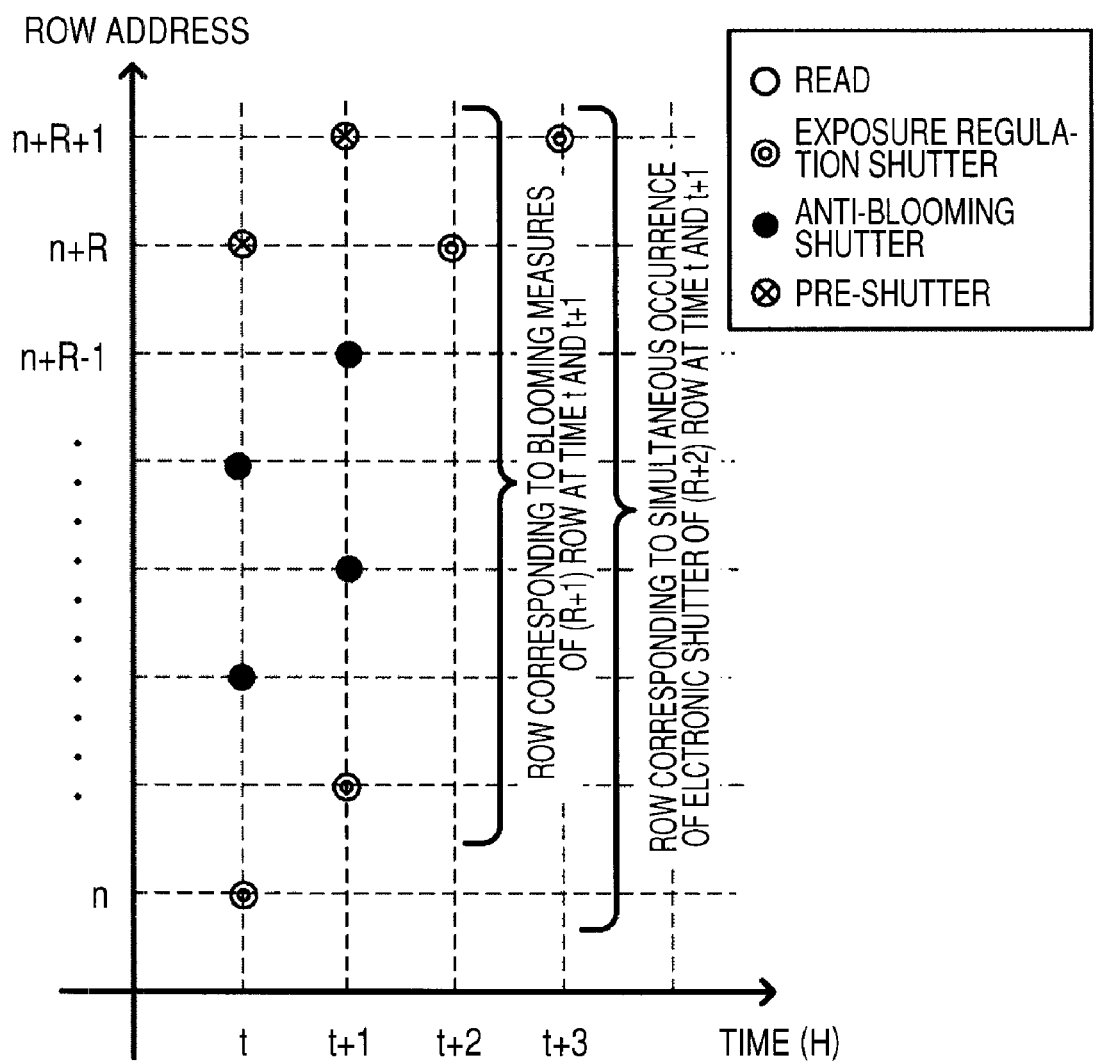
FIG. 11 is a view illustrating a fifth embodiment of the electronic shutter occurrence number control.

FIG. 11 shows a fifth embodiment of a control of the electronic shutter occurrence number made by the sensor controller 16.

The fifth embodiment is an embodiment in which a concept of the pre-shutter in the first embodiment is added to the third embodiment described with reference to FIG. 9.

At time t [H] and time (t+1) [H], a pre-shutter needs to occur on a row of a row address (n+R+1) corresponding to an adjacent row of a row address (n+R) which is an object row of the exposure regulation shutter at time (t+2) [H]. In addition, since it is preferable to perform the pre-shutter in a state divided into two horizontal scanning periods of time t [H] and time (t+1) [H], the minimum electronic shutter occurrence number that needs to be performed per one horizontal scanning period is ((R+2)/2).

Therefore, deterioration of the image quality caused by blooming can be suppressed by setting the electronic shutter occurrence number within one horizontal scanning period to ((R+2)/2) or more and performing an electronic shutter on rows of discontinuous row addresses with every other row skipped.

In addition, although it is preferable that the electronic shutter occurrence number within one horizontal scanning period be ((R+2)/2) or more, it is most preferable that the electronic shutter occurrence number within one horizontal scanning period be ((R+2)/2) since a current consumed increases or transfer failure easily occurs as the electronic shutter occurrence number increases.

The fifth embodiment described above is an example of the thinning-out mode. However, the concept of the anti-blooming shutter and the pre-shutter may also be applied to all pixel reading. Since R is 2 in the case of all pixel reading, the electronic shutter occurrence number within one horizontal scanning period is two.

In the fourth and fifth embodiments described above, as can be understood with reference to FIGS. 10 and 11, it can be said that the pre-shutter can also function as an anti-blooming shutter since the pre-shutter is disposed to extend the anti-blooming shutter under the same rule (continuous addresses or discontinuous addresses with every other row skipped). Therefore, it can be said that the pre-shutter also functions as an anti-blooming shutter.

Also in the second to fifth embodiments described above, as described in the first embodiment with reference to FIG. 7, a high-quality image can be generated by making equal the electronic shutter occurrence number within one horizontal scanning period or the number of times of electronic shutters occurring in a period equivalent to one frame.

As described above, the image sensor 1 determines the electronic shutter occurrence number within one horizontal scanning period, which includes the exposure regulation shutter in addition to the pre-shutter or the anti-blooming shutter, by an operation based on the address addition amount ($P_1, P_2, P_3, \ldots, P_N$) and makes a control according to the determined electronic shutter number. Thus, if the address addition amount ($P_1, P_2, P_3, \ldots, P_N$) is designated, the electronic shutter occurrence number within one horizontal scanning period can be determined by an operation. As a result, since it is not necessary to prepare a large-capacity table corresponding to various kinds of thinned-out images, which has been performed in known techniques, it is possible to reduce the chip size by reducing the gate size. That is, it is possible to take anti-blooming measures with a simple configuration.

Furthermore, in the above example, it has been described that the address addition amount ($P_1, P_2, P_3, \ldots, P_N$) is designated from the DSP 51 to the sensor controller 16 and the sensor controller 16 calculates the electronic shutter occurrence number on the basis of the designated address addition amount ($P_1, P_2, P_3, \ldots, P_N$). However, as shown in FIG. 12, the DSP 51 may perform an operation on the electronic shutter occurrence number within one horizontal scanning period before supplying the address addition amount ($P_1, P_2, P_3, \ldots, P_N$) to the sensor controller 16 and may supply the electronic shutter occurrence number within one horizontal scanning period to the sensor controller 16 together with the address addition amount ($P_1, P_2, P_3, \ldots, P_N$) through register communication. The same effect can also be obtained in the configuration of an image sensor system including the image sensor 1 and the DSP 51.

In the image sensor 1, since the electronic shutter occurrence number within one horizontal scanning period is controlled (suppressed) by an operation based on the address addition amount ($P_1, P_2, P_3, \ldots, P_N$), it is possible to reduce the occurrence number of unnecessary electronic shutters. As a result, transfer failure caused by an increase in power supply load is suppressed and the yield of the image sensor 1 is improved. In addition, the power consumption is also realized. Moreover, a high-quality image can also be generated in a thinning-out mode by suppressing blooming on a read row required in the thinning-out mode.

In addition, by executing the pre-shutter, a high-quality image can be generated, and in particular, color deviation occurring at the time of short exposure with a large amount of light is suppressed. Whether to perform the pre-shutter is determined only by an operation of adding 2 to the maximum value Q of the absolute value of the address addition amount or the maximum value R of the absolute value of the nearest-neighbor addition amount when the pre-shutter is not performed, as described above. Accordingly, it is possible to easily control the electronic shutter occurrence number including the pre-shutter.

In addition, the above-described control of the electronic shutter occurrence number can also be applied to cases corresponding to all image sizes, such as all pixel reading, ½ thinning out, ⅓ thinning out, ¼ thinning out, ⅕ thinning out, and ⅛ thinning out. That is, the present invention is not limited to the pixel number of the specific image sensor 1 and the size of an thinned-out image that is generated.

In addition, although only thinning out in the V direction has been described in the above example, the same execution may be made in thinning out in the H direction.

Furthermore, in the present specification, a system refers to the entire apparatus configured to include a plurality of apparatuses.

Figure 13:
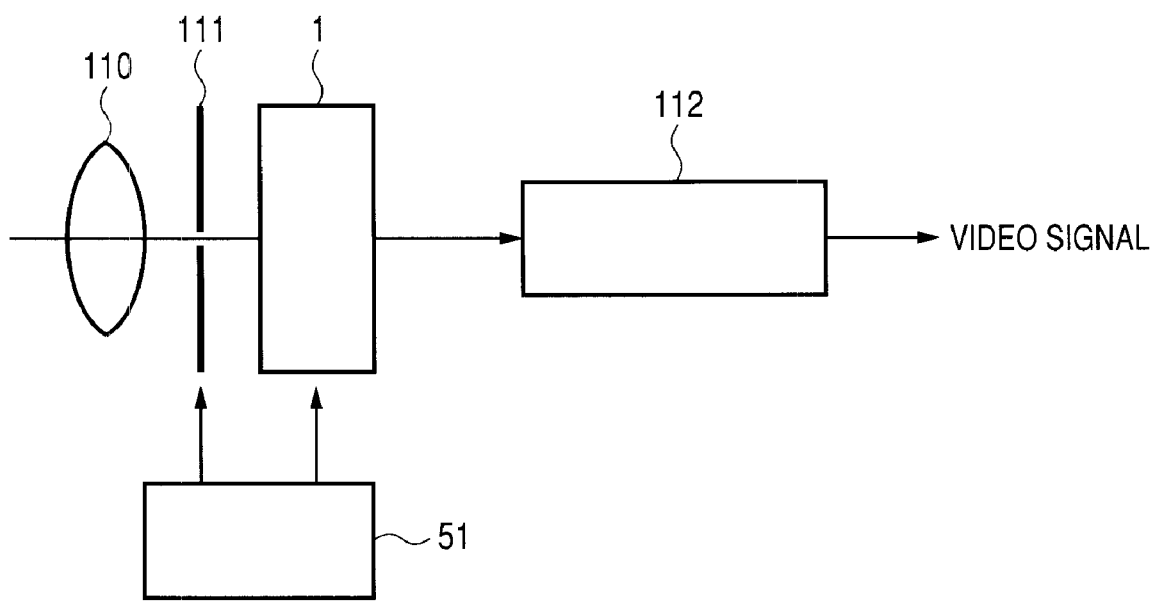
FIG. 13 is a block diagram illustrating a camera according to an embodiment of the present invention.

FIG. 13 is a cross-sectional view illustrating a camera according to each embodiment of the present invention. The camera according to the present embodiment is an example of a video camera capable of photographing a still image or a moving image.

The camera according to the present embodiment includes the image sensor 1, an optical system 110, a shutter device 111, a driving circuit 51, and a signal processing circuit 112.

The optical system 110 makes image light (incident light) from a subject body imaged on an imaging surface of the image sensor 1. As a result, corresponding signal charges are accumulated within the image sensor 1 for a predetermined period.

The shutter device 111 controls a light irradiation period and a light blocking period with respect to the image sensor 1.

The driving circuit 51 supplies a driving signal for controlling a transfer operation of the image sensor 1 and a shutter operation of the shutter device 111. Signal transfer of the image sensor 1 is performed by the driving signal (timing signal) supplied from the driving circuit 51. The signal processing circuit 112 performs various kinds of signal processing. A video signal subjected to signal processing is stored in a storage medium, such as a memory, or output to a monitor.

In the above embodiments, the case where the present invention is applied to the image sensor 1, in which unit pixels that detect signal charges corresponding to the light amount of visible light as a physical amount are arrayed in a matrix, has been described as an example. However, the present invention is not limited to being applied to the image sensor 1 but may also be applied to all kinds of column type solid-state imaging devices in which a column circuit is disposed for every pixel column of a pixel array section.

Furthermore, the present invention is not limited to being applied to a solid-state imaging device that detects the distribution of incident light amount of visible light and images the distribution as an image but may also be applied to a solid-state imaging device that images infrared rays or X rays or the distribution of incident amount of particles and the like as an image or in a broader meaning, to all kinds of solid-state imaging devices (physical amount distribution detecting devices), such as a fingerprint detecting sensor, which detect the distribution of another physical amount, such as pressure or electrostatic capacitance, and images the distribution as an image.

Furthermore, the present invention is not limited to being applied to a solid-state imaging device that sequentially scans unit pixels of a pixel array section in the unit of a row and reads a pixel signal from each of the unit pixels but may also be applied to an X-Y address type solid-state imaging device that selects an arbitrary pixel in the unit of a pixel and reads a signal from the selected pixel in the unit of a pixel.

Furthermore, a solid-state imaging device may be formed in the form of one chip or may be formed in the form of a module having an imaging function in a state where an imaging section and a signal processing section or an optical system are packaged in groups.

In addition, the present invention is not limited to being applied to solid-state imaging devices but may also be applied to imaging apparatuses. Here, the imaging apparatuses refer to a camera system, such as a digital camera or a video camera, or an electronic apparatus having an imaging function, such as a mobile phone. In addition, the form of a module mounted in an electronic apparatus, that is, a camera module may be an imaging apparatus.

By using the image sensor 1 according to the above-described embodiments as a solid-state imaging device in a video camera or a digital camera or an imaging apparatus, such as a camera module for a mobile apparatus such as a mobile phone, it is possible to obtain a high-quality image with a simple configuration in the image sensor 1.

Embodiments of the present invention are not limited to the above-described embodiments, but various modifications may be made without departing from the spirit and scope of the present invention.

What is claimed is:

1. An image sensor that has a pixel array section in which pixels are arrayed in a two-dimensional manner in vertical and horizontal directions and that controls an exposure time of each pixel in a rolling shutter method, comprising:

control means for determining an electronic shutter occurrence number within one horizontal scanning period, which is the number of rows where electronic shutters are simultaneously performed in one horizontal scanning period, by an operation based on an address addition amount $(P_1, P_2, P_3, \ldots, P_N)$ when a vertical address movement amount of the pixel array section for every one horizontal scanning period in an electronic shutter for regulating exposure, executed corresponding to electric charge reading in each pixel is expressed as repetition of the address addition amount $(P_1, P_2, P_3, \ldots, P_N)$, wherein, the control means determines the electronic shutter occurrence number within one horizontal scanning period on the basis of a maximum value Q of an absolute value of each of the address addition amounts $P_1, P_2, P_3, \ldots, P_N$ in the case of generating a thinned-out image in which the number of pixels in the vertical or horizontal direction is thinned out according to the address addition amount $(P_1, P_2, P_3, \ldots, P_N)$.

2. The image sensor according to claim 1, wherein the control means makes a control such that an electronic shutter is performed on rows of addresses in the vertical direction that are continuous by the determined electronic shutter occurrence number within one horizontal scanning period from an object row of the exposure regulation shutter.

3. The image sensor according to claim 2, wherein the control means makes a control such that the electronic shutter is performed on Q or more rows of addresses in the vertical direction that are continuous from the object row of the exposure regulation shutter.

4. The image sensor according to claim 3, wherein the control means makes a control such that the electronic shutter is performed on (Q+2) rows of addresses in the vertical direction that are continuous from the object row of the exposure regulation shutter.

5. An image sensor that has a pixel array section in which pixels are arrayed in a two-dimensional manner in vertical and horizontal directions and that controls an exposure time of each pixel in a rolling shutter method, comprising:

control means for determining an electronic shutter occurrence number within one horizontal scanning period, which is the number of rows where electronic shutters are simultaneously performed in one horizontal scanning period, by an operation based on an address addition amount $(P_1, P_2, P_3, \ldots, P_N)$ when a vertical address movement amount of the pixel array section for every one horizontal scanning period in an electronic shutter for regulating exposure, executed corresponding to electric charge reading in each pixel is expressed as repetition of the address addition amount $(P_1, P_2, P_3, \ldots, P_N)$, wherein, the control means determines the electronic shutter occurrence number within one horizontal scanning period on the basis of a maximum value R of an absolute value of each of nearest-neighbor addition amounts $P_1+P_2, P_2+P_3, P_3+P_4, \ldots, P_{N-1}+P_N, P_N+P_1$, which are obtained by adding address addition amounts of rows adjacent to each other, in the case of generating a thinned-out image in which the number of pixels in the vertical or horizontal direction is thinned out according to the address addition amount $(P_1, P_2, P_3, \ldots, P_N)$.

6. The image sensor according to claim 5, wherein the control means makes a control such that an electronic shutter is performed on discontinuous rows of addresses in the vertical direction with every other row skipped from an object row of the exposure regulation shutter.

7. The image sensor according to claim 6, wherein the control means makes a control such that the electronic shutter is performed on (R/2) or more discontinuous rows of addresses in the vertical direction with every other row skipped from the object row of the exposure regulation shutter.

8. The image sensor according to claim 7, wherein the control means makes a control such that the electronic shutter is performed on ((R+2)/2)) discontinuous rows of addresses in the vertical direction with every other row skipped from the object row of the exposure regulation shutter.

9. An image sensor comprising:

a pixel array section in which pixels are arrayed in a two-dimensional manner in vertical and horizontal directions; and a pre-shutter that is an operation of sweeping out unnecessary electric charges is performed before an exposure regulation shutter;

control means for determining an electronic shutter occurrence number within one horizontal scanning period, which is the number of rows where electronic shutters are simultaneously performed in one horizontal scanning period, by an operation based on an address addition amount $(P_1, P_2, P_3, \ldots, P_N)$ when a vertical address movement amount of the pixel array section for every one horizontal scanning period in an electronic shutter for regulating exposure, executed corresponding to the electric charge reading in each pixel is expressed as repetition of the address addition amount $(P_1, P_2, P_3, \ldots, P_N)$, wherein, reading of electric charges accumulated in pixels and the exposure regulation shutter, which is an operation of sweeping out unnecessary electric charges, are performed sequentially in the unit of rows in the vertical direction, and the control means determines the electronic shutter occurrence number within one horizontal scanning period on the basis of a maximum value Q of an absolute value of each of the address addition amounts $P_1, P_2, P_3, \ldots, P_N$ in the case of generating a thinned-out image in which the number of pixels in the vertical or horizontal direction is thinned out according to the address addition amount $(P_1, P_2, P_3, \ldots, P_N)$.

10. An electronic apparatus that has a pixel array section in which pixels are arrayed in a two-dimensional manner in vertical and horizontal directions and that controls an exposure time of each pixel in a rolling shutter method, comprising:

control means for determining an electronic shutter occurrence number within one horizontal scanning period, which is the number of rows where electronic shutters are simultaneously performed in one horizontal scanning period, by an operation based on an address addition amount $(P_1, P_2, P_3, \ldots, P_N)$ when a vertical address movement amount of the pixel array section for every one horizontal scanning period in an exposure regulation shutter, which is an electronic shutter for regulating exposure, executed corresponding to electric charge reading in each pixel is expressed as repetition of the address addition amount $(P_1, P_2, P_3, \ldots, P_N)$, wherein, the control means determines the electronic shutter occurrence number within one horizontal scanning period on the basis of a maximum value Q of an absolute value of each of the address addition amounts $P_1, P_2, P_3, \ldots, P_N$ in the case of generating a thinned-out image in which the number of pixels in the vertical or horizontal direction is thinned out according to the address addition amount $(P_1, P_2, P_3, \ldots, P_N)$.

11. A driving method of an electronic apparatus that has a pixel array section in which pixels are arrayed in a two-dimensional manner in vertical and horizontal directions and that controls an exposure time of each pixel in a rolling shutter method, comprising the step of:

determining an electronic shutter occurrence number within one horizontal scanning period, which is the number of rows where electronic shutters are simultaneously performed in one horizontal scanning period, by an operation based on an address addition amount $(P_1, P_2, P_3, \ldots, P_N)$ when a vertical address movement amount of the pixel array section for every one horizontal scanning period in an exposure regulation shutter, which is an electronic shutter for regulating exposure, executed corresponding to electric charge reading in each pixel is expressed as repetition of the address addition amount $(P_1, P_2, P_3, \ldots, P_N)$, wherein, the electronic shutter occurrence number is determined on the basis of a maximum value Q of an absolute value of each of the address addition amounts $P_1, P_2, P_3, \ldots, P_N$ in the case of generating a thinned-out image in which the number of pixels in the vertical or horizontal direction is thinned out according to the address addition amount $(P_1, P_2, P_3, \ldots, P_N)$.

12. An image sensor that has a pixel array section in which pixels are arrayed in a two-dimensional manner in vertical and horizontal directions and that controls an exposure time of each pixel in a rolling shutter method, comprising:

a control section determining an electronic shutter occurrence number within one horizontal scanning period, which is the number of rows where electronic shutters are simultaneously performed in one horizontal scanning period, by an operation based on an address addition amount $(P_1, P_2, P_3, \ldots, P_N)$ when a vertical address movement amount of the pixel array section for every one horizontal scanning period in an exposure regulation shutter, which is an electronic shutter for regulating exposure, executed corresponding to electric charge reading in each pixel is expressed as repetition of the address addition amount ($P_1, P_2, P_3, \ldots, P_N$), wherein, the control sections determines the electronic shutter occurrence number within one horizontal scanning period on the basis of a maximum value Q of an absolute value of each of the address addition amounts $P_1, P_2, P_3, \ldots, P_N$ in the case of generating a thinned-out image in which the number of pixels in the vertical or horizontal direction is thinned out according to the address addition amount ($P_1, P_2, P_3, \ldots, P_N$).

13. An electronic apparatus that has a pixel array section in which pixels are arrayed in a two-dimensional manner in vertical and horizontal directions and that controls an exposure time of each pixel in a rolling shutter method, comprising:

a control section determining an electronic shutter occurrence number within one horizontal scanning period, which is the number of rows where electronic shutters are simultaneously performed in one horizontal scanning period, by an operation based on an address addition amount ($P_1, P_2, P_3, \ldots, P_N$) when a vertical address movement amount of the pixel array section for every one horizontal scanning period in an exposure regulation shutter, which is an electronic shutter for regulating exposure, executed corresponding to electric charge reading in each pixel is expressed as repetition of the address addition amount ($P_1, P_2, P_3, \ldots, P_N$), wherein, the control means determines the electronic shutter occurrence number within one horizontal scanning period on the basis of a maximum value Q of an absolute value of each of the address addition amounts $P_1, P_2, P_3, \ldots, P_N$ in the case of generating a thinned-out image in which the number of pixels in the vertical or horizontal direction is thinned out according to the address addition amount ($P_1, P_2, P_3, \ldots, P_N$).

14. An image sensor comprising:

a pixel array section in which pixels are arrayed in a two-dimensional manner in vertical and horizontal direction; and a pre-shutter that is an operation of sweeping out unnecessary electric charges is performed before an exposure regulation shutter;

control means for determining an electronic shutter occurrence number within one horizontal scanning period, which is the number of rows where electronic shutters are simultaneously performed in one horizontal scanning period, by an operation based on an address addition amount ($P_1, P_2, P_3, \ldots, P_N$) when a vertical address movement amount of the pixel array section for every one horizontal scanning period in an electronic shutter for regulating exposure, executed corresponding to the electric charge reading in each pixel is expressed as repetition of the address addition amount ($P_1, P_2, P_3, \ldots, P_N$), wherein, reading of electric charges accumulated in pixels and the exposure regulation shutter, which is an operation of sweeping out unnecessary electric charges, are performed sequentially in the unit of rows in the vertical direction, and the control means determines the electronic shutter occurrence number within one horizontal scanning period on the basis of a maximum value R of an absolute value of each of the nearest-neighbor addition amounts $P_1+P_2, P_2+P_3, P_3+P_4, \ldots, P_{N-1}+P_N, P_N+P_1$, which are obtained by adding address addition amounts of rows adjacent to each other, in the case of generating a thinned-out image in which the number of pixels in the vertical or horizontal direction is thinned out according to the address addition amounts ($P_1, P_2, P_3, \ldots, P_N$).

15. An electronic apparatus that has a pixel array section in which pixels are arrayed in a two-dimensional manner in vertical and horizontal directions and that controls an exposure time of each pixel in a rolling shutter method, comprising:

control means for determining an electronic shutter occurrence number within one horizontal scanning period, which is the number of rows where electronic shutters are simultaneously performed in one horizontal scanning period, by an operation based on an address addition amount ($P_1, P_2, P_3, \ldots, P_N$) when a vertical address movement amount of the pixel array section for every one horizontal scanning period in an exposure regulation shutter, which is an electronic shutter for regulating exposure, executed corresponding to electric charge reading in each pixel is expressed as repetition of the address addition amount ($P_1, P_2, P_3, \ldots, P_N$), wherein, the control means determines the electronic shutter occurrence number within one horizontal scanning period on the basis of a maximum value R of an absolute value of each of nearest-neighbor addition amounts $P_1+P_2, P_2+P_3, P_3+P_4, \ldots, P_{N-1}+P_N, P_N+P_1$, which are obtained by adding address addition amounts of rows adjacent to each other, in the case of generating a thinned-out image in which the number of pixels in the vertical or horizontal direction is thinned out according to the address addition amount ($P_1, P_2, P_3, \ldots, P_N$).

16. A driving method of an electronic apparatus that has a pixel array section in which pixels are arrayed in a two-dimensional manner in vertical and horizontal directions and that controls an exposure time of each pixel in a rolling shutter method, comprising the step of:

determining an electronic shutter occurrence number within one horizontal scanning period, which is the number of rows where electronic shutters are simultaneously performed in one horizontal scanning period, by an operation based on an address addition amount ($P_1, P_2, P_3, \ldots, P_N$) when a vertical address movement amount of the pixel array section for every one horizontal scanning period in an exposure regulation shutter, which is an electronic shutter for regulating exposure, executed corresponding to electric charge reading in each pixel is expressed as repetition of the address addition amount ($P_1, P_2, P_3, \ldots, P_N$), wherein, the electronic shutter occurrence number within one horizontal scanning period is determined on the basis of a maximum value R of an absolute value of each of nearest-neighbor addition amounts $P_1+P_2, P_2+P_3, P_3+P_4, \ldots, P_{N-1}+P_N, P_N+P_1$, which are obtained by adding address addition amounts of rows adjacent to each other, in the case of generating a thinned-out image in which the number of pixels in the vertical or horizontal direction is thinned out according to the address addition amount ($P_1, P_2, P_3, \ldots, P_N$).

17. An image sensor that has a pixel array section in which pixels are arrayed in a two-dimensional manner in vertical and horizontal directions and that controls an exposure time of each pixel in a rolling shutter method, comprising:

a control section determining an electronic shutter occurrence number within one horizontal scanning period, which is the number of rows where electronic shutters are simultaneously performed in one horizontal scanning period, by an operation based on an address addition amount $(P_1, P_2, P_3, \ldots, P_N)$ when a vertical address movement amount of the pixel array section for every one horizontal scanning period in an exposure regulation shutter, which is an electronic shutter for regulating exposure, executed corresponding to electric charge reading in each pixel is expressed as repetition of the address addition amount $(P_1, P_2, P_3, \ldots, P_N)$, wherein, the control section determines the electronic shutter occurrence number within one horizontal scanning period on the basis of a maximum value R of an absolute value of each of nearest-neighbor addition amounts $P_1+P_2, P_2+P_3, P_3+P_4, \ldots, P_{N-1}+P_N, P_N+P_1$, which are obtained by adding address addition amounts of rows adjacent to each other, in the case of generating a thinned-out image in which the number of pixels in the vertical or horizontal direction is thinned out according to the address addition amount $(P_1, P_2, P_3, \ldots, P_N)$.

18. An electronic apparatus that has a pixel array section in which pixels are arrayed in a two-dimensional manner in vertical and horizontal directions and that controls an exposure time of each pixel in a rolling shutter method, comprising:

a control section determining an electronic shutter occurrence number within one horizontal scanning period, which is the number of rows where electronic shutters are simultaneously performed in one horizontal scanning period, by an operation based on an address addition amount $(P_1, P_2, P_3, \ldots, P_N)$ when a vertical address movement amount of the pixel array section for every one horizontal scanning period in an exposure regulation shutter, which is an electronic shutter for regulating exposure, executed corresponding to electric charge reading in each pixel is expressed as repetition of the address addition amount $(P_1, P_2, P_3, \ldots, P_N)$, wherein, the control section determines the electronic shutter occurrence number within one horizontal scanning period on the basis of a maximum value R of an absolute value of each of nearest-neighbor addition amounts $P_1+P_2, P_2+P_3, P_3+P_4, \ldots, P_{N-1}+P_N, P_N+P_1$, which are obtained by adding address addition amounts of rows adjacent to each other, in the case of generating a thinned-out image in which the number of pixels in the vertical or horizontal direction is thinned out according to the address addition amount $(P_1, P_2, P_3, \ldots, P_N)$.

* * * * *